(12) United States Patent
Lee

(10) Patent No.: US 11,190,759 B2
(45) Date of Patent: Nov. 30, 2021

(54) METHOD AND APPARATUS FOR PROCESSING VIDEO SIGNAL

(71) Applicant: KT CORPORATION, Gyeonggi-do (KR)

(72) Inventor: Bae Keun Lee, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 17/038,414

(22) Filed: Sep. 30, 2020

(65) Prior Publication Data

US 2021/0014485 A1  Jan. 14, 2021

Related U.S. Application Data

(63) Continuation of application No. 16/334,841, filed as application No. PCT/KR2017/010353 on Sep. 20, 2017, now Pat. No. 10,834,386.

(30) Foreign Application Priority Data

Sep. 20, 2016  (KR) ........................ 10-2016-0120079

(51) Int. Cl.
  *H04N 19/105*  (2014.01)
  *H04N 19/132*  (2014.01)
  (Continued)

(52) U.S. Cl.
  CPC ......... *H04N 19/105* (2014.11); *H04N 19/132* (2014.11); *H04N 19/159* (2014.11); *H04N 19/176* (2014.11)

(58) Field of Classification Search
  CPC .... H04N 19/176; H04N 19/182; H04N 19/96; H04N 19/159; H04N 19/82;
  (Continued)

(56) References Cited

U.S. PATENT DOCUMENTS 9,693,058 B2  6/2017  Gamei et al.
10,045,042 B2  8/2018  Lee et al.
(Continued)

FOREIGN PATENT DOCUMENTS

EP  2388999 A2  11/2011
EP  2658263 A2  10/2013
(Continued)

OTHER PUBLICATIONS

Jianle Chen et al., "Algorithm Description of Joint Exploration Test Model 2", Document: JVET-B1001_V1, Joint Video Exploration Team (JVET) of ITU-T SG 16 WP 3 and ISO/IEC JTC 1/SC 29/WG 11, 2nd Meeting: San Diego, USA, Feb. 20-26, 2016.
(Continued)

*Primary Examiner* — Neil R Mikeska
(74) *Attorney, Agent, or Firm* — IP Legal Services, LLC

(57) ABSTRACT

A method for decoding a video according to the present invention may comprise: determining an intra prediction mode of a current block, determining, based on the intra prediction mode, a first reference sample of a prediction target sample included in the current block, generating a first prediction sample for the prediction target sample using the first reference sample, and generating a second prediction sample for the prediction target sample using the first prediction sample and a second reference sample located at a position different from the first reference sample.

9 Claims, 17 Drawing Sheets

(51) Int. Cl.
*H04N 19/159* (2014.01)
*H04N 19/176* (2014.01)

(58) Field of Classification Search
CPC ...... H04N 19/186; H04N 19/70; H04N 19/11; H04N 19/86; H04N 19/157; H04N 19/105; H04N 19/174; H04N 19/593; H04N 19/132; H04N 19/187
See application file for complete search history.

(56) References Cited

U.S. PATENT DOCUMENTS

| | | |
|---|---|---|
| 2011/0280304 A1 | 11/2011 | Jeon et al. |
| 2011/0292994 A1 | 12/2011 | Lim et al. |
| 2011/0293001 A1 | 12/2011 | Lim et al. |
| 2013/0272405 A1 | 10/2013 | Jeon et al. |
| 2013/0272623 A1 | 10/2013 | Jeon et al. |
| 2013/0329794 A1 | 12/2013 | Jeon et al. |
| 2014/0056352 A1 | 2/2014 | Park et al. |
| 2014/0133565 A1 | 5/2014 | Lee et al. |
| 2014/0321542 A1 | 10/2014 | Lim et al. |
| 2014/0328397 A1 | 11/2014 | Jeon et al. |
| 2015/0016516 A1 | 1/2015 | Saxena et al. |
| 2015/0110174 A1 | 4/2015 | Gu et al. |
| 2015/0229965 A1 | 8/2015 | Park et al. |
| 2015/0249834 A1* | 9/2015 | Min ................... H04N 19/11 375/240.12 |
| 2015/0264379 A1 | 9/2015 | Lee et al. |
| 2015/0264380 A1 | 9/2015 | Lee et al. |
| 2015/0264381 A1 | 9/2015 | Lee et al. |
| 2015/0264382 A1 | 9/2015 | Lee et al. |
| 2015/0288980 A1 | 10/2015 | Lee et al. |
| 2015/0350640 A1 | 12/2015 | Jeong et al. |
| 2016/0198189 A1* | 7/2016 | Lee ................... H04N 19/80 375/240.12 |
| 2016/0330478 A1 | 11/2016 | Jeon et al. |
| 2017/0230669 A1 | 8/2017 | Jeong et al. |
| 2017/0235848 A1 | 8/2017 | Van Dusen et al. |
| 2017/0280157 A1 | 9/2017 | Jeon et al. |
| 2017/0316276 A1 | 11/2017 | Lim et al. |
| 2017/0347118 A1 | 11/2017 | Jeon et al. |
| 2018/0124426 A1 | 5/2018 | Jeon et al. |
| 2018/0234679 A1 | 8/2018 | Heo et al. |
| 2018/0288408 A1* | 10/2018 | Ikai ................... H04N 19/126 |
| 2019/0028733 A1 | 1/2019 | Lee et al. |
| 2019/0089980 A1 | 3/2019 | Jeon et al. |
| 2019/0141318 A1 | 5/2019 | Li et al. |
| 2019/0174142 A1 | 6/2019 | Jeon et al. |
| 2019/0200011 A1* | 6/2019 | Yoo ................... H04N 19/176 |
| 2019/0385002 A1 | 12/2019 | Lim et al. |
| 2020/0228829 A1 | 7/2020 | Jeon et al. |
| 2020/0329255 A1 | 10/2020 | Jeon et al. |

FOREIGN PATENT DOCUMENTS

| | | |
|---|---|---|
| KR | 10-2015-0093633 A | 8/2015 |
| KR | 10-2016-0014082 A | 2/2016 |
| KR | 10-2016-0032088 A | 3/2016 |
| KR | 10-1600063 B1 | 3/2016 |
| KR | 10-1645787 B1 | 8/2016 |

OTHER PUBLICATIONS

Gary J. Sullivan et al., "Overview of the High Efficiency Video Coding (HEVC) Standard", IEEE Transactions on Circuits and Systems for Video Technology, vol. 22, No. 12, Dec. 2012, pp. 1649-1668.
European Patent Office, European Search Report of corresponding EP Patent Application No. 17853415.2, dated Mar. 24, 2020.
Vivienne Sze et al., "High Efficiency Video Coding (HEVC)", Algorithms and Architectures, Springer International Publishing, Switzerland, 2014.

* cited by examiner

METHOD AND APPARATUS FOR PROCESSING VIDEO SIGNAL

CROSS REFERENCE TO RELATED APPLICATIONS

This application is a Continuation of U.S. patent application Ser. No. 16/334,841 (filed on Mar. 20, 2019), which is a National Stage Patent Application of PCT International Patent Application No. PCT/KR2017/010353 (filed on Sep. 20, 2017) under 35 U.S.C. § 371, which claims priority to Korean Patent Application No. 10-2016-0120079 (filed on Sep. 20, 2016), the teachings of which are incorporated herein in their entireties by reference.

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; etc. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

An object of the present invention is to provide a method and an apparatus for efficiently performing intra-prediction for an encoding/decoding target block in encoding/decoding a video signal.

An object of the present invention is to provide a method and an apparatus for performing intra prediction through a weighted prediction using a plurality of reference samples in encoding/decoding a video signal.

The technical objects to be achieved by the present invention are not limited to the above-mentioned technical problems. And, other technical problems that are not mentioned will be apparently understood to those skilled in the art from the following description.

Technical Solution

A method and an apparatus for decoding a video signal according to the present invention may determine an intra prediction mode of a current block, determine, based on the intra prediction mode, a first reference sample of a prediction target sample included in the current block, generate a first prediction sample for the prediction target sample using the first reference sample, and generate a second prediction sample for the prediction target sample using the first prediction sample and a second reference sample located at a position different from the first reference sample.

A method and an apparatus for encoding a video signal according to the present invention may determine an intra prediction mode of a current block, determine, based on the intra prediction mode, a first reference sample of a prediction target sample included in the current block, generate a first prediction sample for the prediction target sample using the first reference sample, and generate a second prediction sample for the prediction target sample using the first prediction sample and a second reference sample located at a position different from the first reference sample.

In the method and the apparatus for encoding/decoding a video signal according to the present invention, the second reference sample may comprise at least one of a reference sample lying on a same horizontal line as the prediction target sample or a reference sample lying on a same vertical line as the prediction target sample.

In the method and the apparatus for encoding/decoding a video signal according to the present invention, each of the first reference sample and the second reference sample may be adjacent to different boundaries of the current block.

In the method and the apparatus for encoding/decoding a video signal according to the present invention, a position of the second reference sample may be determined based on a directionality of the intra prediction mode.

In the method and the apparatus for encoding/decoding a video signal according to the present invention, the second prediction sample may be generated based on a weighted sum of the first prediction sample and the second reference sample.

In the method and the apparatus for encoding/decoding a video signal according to the present invention, weights applied to each of the first prediction sample and the second reference sample may be determined based on a position of the first reference sample and a position of the second reference sample.

In the method and the apparatus for encoding/decoding a video signal according to the present invention, whether to generate the second prediction sample may be determined according to a directionality of the intra prediction mode.

The features briefly summarized above for the present invention are only illustrative aspects of the detailed description of the invention that follows, but do not limit the scope of the invention.

Advantageous Effects

According to the present invention, intra-prediction may be performed efficiently for an encoding/decoding target block.

According to the present invention, intra prediction can be performed based on a weighted prediction using a plurality of reference samples.

The effects obtainable by the present invention are not limited to the above-mentioned effects, and other effects not mentioned can be clearly understood by those skilled in the art from the description below.

MODE FOR INVENTION

Figure 1:
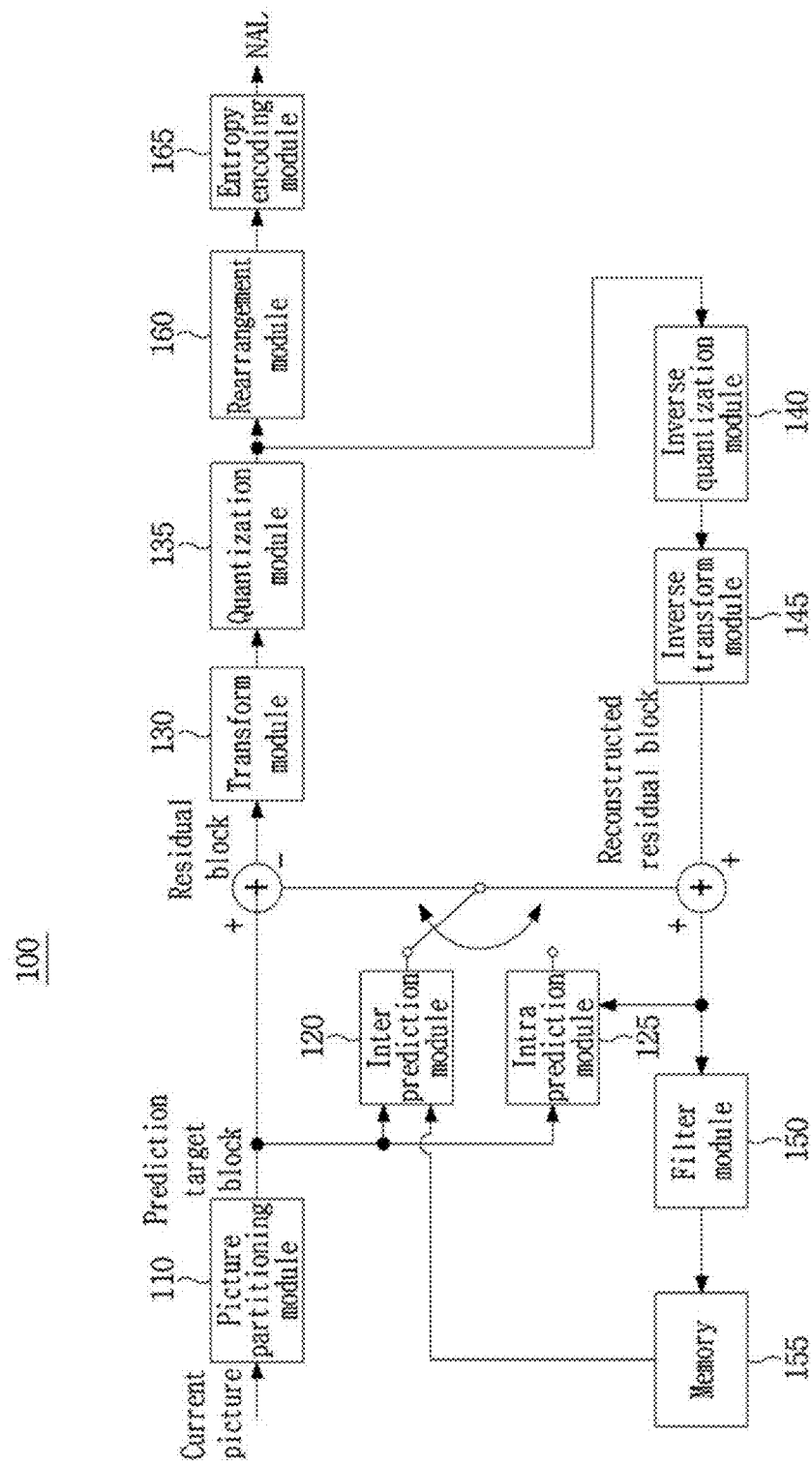
FIG. 1 is a block diagram illustrating a device for encoding a video according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present invention.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of multiple coding units, prediction units, and transform units, and may encode a picture by selecting one combination of coding units, prediction units, and transform units with a predetermined criterion (e.g., cost function).

For example, one picture may be partitioned into multiple coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so as to have a different shape/size in a single coding unit.

When a prediction unit subjected to intra prediction is generated based on a coding unit and the coding unit is not the smallest coding unit, intra prediction may be performed without partitioning the coding unit into multiple prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit subjected to prediction may be different from the processing unit for which the prediction method and detailed content is determined. For example, the prediction method, the prediction mode, etc. may be determined by the prediction unit, and prediction may be performed by the transform unit. A residual value (residual block) between the generated prediction block and an original block may be input to the transform module 130. Also, prediction mode information, motion vector information, etc. used for prediction may be encoded with the residual value by the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel in units of a ¼ pixel. In the case of chroma signals, a 4-tap DCT-based interpolation filter having different filter coefficient may be used to generate pixel information of an integer pixel or less than an integer pixel in units of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value in units of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when the size of the prediction unit is the same as the size of the transform unit, intra prediction may be performed on the prediction unit based on pixels positioned at the left, the top left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

In the intra prediction method, a prediction block may be generated after applying an AIS (Adaptive Intra Smoothing) filter to a reference pixel depending on the prediction modes. The type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on the size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, and an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture in units of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be divided into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
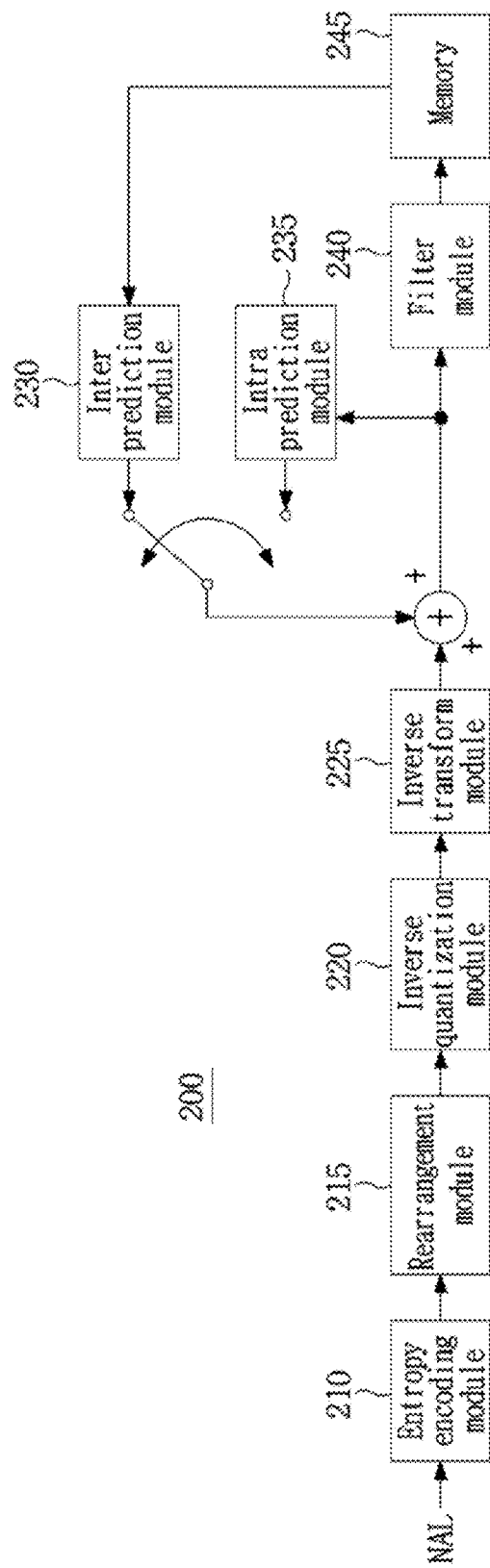
FIG. 2 is a block diagram illustrating a device for decoding a video according to an embodiment of the present invention.

FIG. 2 is a block diagram illustrating a device for decoding a video according to an embodiment of the present invention.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on multiple pieces of information, such as the prediction method, the size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when the size of the prediction unit is the same as the size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may divide a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on the type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, a current block may represent a target block to be encoded/decoded. And, the current block may represent a coding tree block (or a coding tree unit), a coding block (or a coding unit), a transform block (or a transform unit), a prediction block (or a prediction unit), or the like depending on an encoding/decoding step.

A picture may be encoded/decoded by divided into base blocks having a square shape or a non-square shape. At this time, the base block may be referred to as a coding tree unit. The coding tree unit may be defined as a coding unit of the largest size allowed within a sequence or a slice. Information regarding whether the coding tree unit has a square shape or has a non-square shape or information regarding a size of the coding tree unit may be signaled through a sequence parameter set, a picture parameter set, or a slice header. The coding tree unit may be divided into smaller size partitions. At this time, if it is assumed that a depth of a partition generated by dividing the coding tree unit is 1, a depth of a partition generated by dividing the partition having depth 1 may be defined as 2. That is, a partition generated by dividing a partition having a depth k in the coding tree unit may be defined as having a depth k+1.

A partition of arbitrary size generated by dividing a coding tree unit may be defined as a coding unit. The coding unit may be recursively divided or divided into base units for performing prediction, quantization, transform, or in-loop filtering, and the like. For example, a partition of arbitrary size generated by dividing the coding unit may be defined as a coding unit, or may be defined as a transform unit or a prediction unit, which is a base unit for performing prediction, quantization, transform or in-loop filtering and the like.

Partitioning of a coding tree unit or a coding unit may be performed based on at least one of a vertical line and a horizontal line. In addition, the number of vertical lines or horizontal lines partitioning the coding tree unit or the coding unit may be at least one or more. For example, the coding tree unit or the coding unit may be divided into two partitions using one vertical line or one horizontal line, or the coding tree unit or the coding unit may be divided into three partitions using two vertical lines or two horizontal lines. Alternatively, the coding tree unit or the coding unit may be partitioned into four partitions having a length and a width of ½ by using one vertical line and one horizontal line.

When a coding tree unit or a coding unit is divided into a plurality of partitions using at least one vertical line or at least one horizontal line, the partitions may have a uniform size or a different size. Alternatively, any one partition may have a different size from the remaining partitions.

In the embodiments described below, it is assumed that a coding tree unit or a coding unit is divided into a quad tree structure or a binary tree structure. However, it is also possible to divide a coding tree unit or a coding unit using a larger number of vertical lines or a larger number of horizontal lines.

Figure 3:
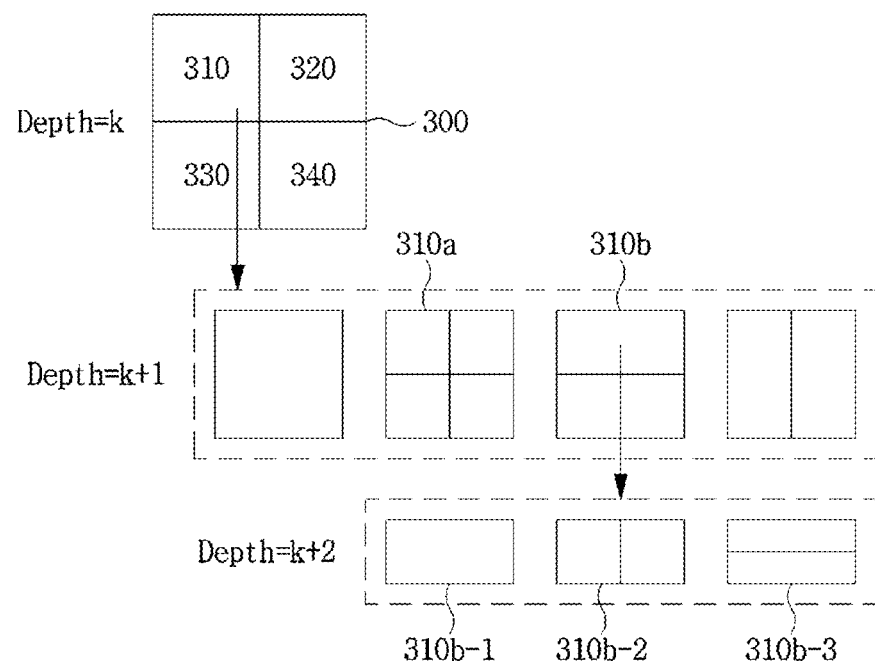
FIG. 3 is a diagram illustrating an example of hierarchically partitioning a coding block based on a tree structure according to an embodiment of the present invention.
Figure 4:
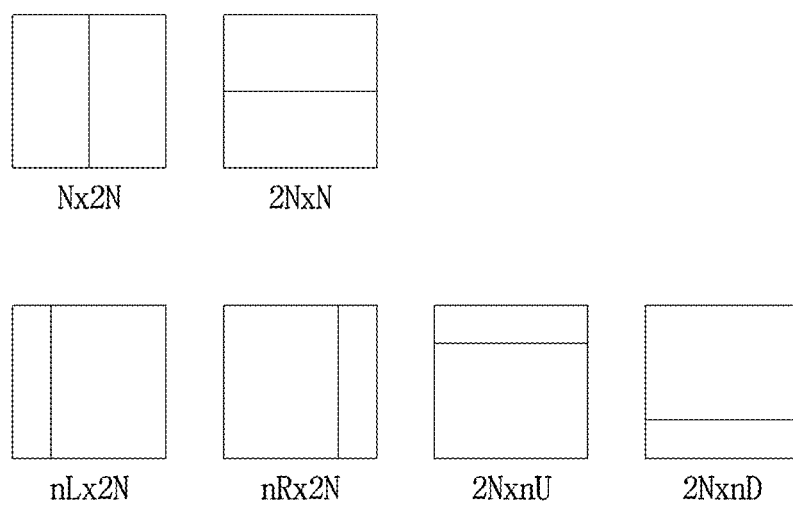
FIG. 4 is a diagram illustrating a partition type in which binary tree-based partitioning is allowed according to an embodiment of the present invention.

FIG. 3 is a diagram illustrating an example of hierarchically partitioning a coding block based on a tree structure according to an embodiment of the present invention.

An input video signal is decoded in predetermined block units. Such a default unit for decoding the input video signal is a coding block. The coding block may be a unit performing intra/inter prediction, transform, and quantization. In addition, a prediction mode (e.g., intra prediction mode or inter prediction mode) is determined in units of a coding block, and the prediction blocks included in the coding block may share the determined prediction mode. The coding block may be a square or non-square block having an arbitrary size in a range of 8×8 to 64×64, or may be a square or non-square block having a size of 128×128, 256×256, or more.

Specifically, the coding block may be hierarchically partitioned based on at least one of a quad tree and a binary tree. Here, quad tree-based partitioning may mean that a 2N×2N coding block is partitioned into four N×N coding blocks, and binary tree-based partitioning may mean that one coding block is partitioned into two coding blocks. Even if the binary tree-based partitioning is performed, a square-shaped coding block may exist in the lower depth.

Binary tree-based partitioning may be symmetrically or asymmetrically performed. The coding block partitioned based on the binary tree may be a square block or a non-square block, such as a rectangular shape. For example, a partition type in which the binary tree-based partitioning is allowed may comprise at least one of a symmetric type of 2N×N (horizontal directional non-square coding unit) or N×2N (vertical direction non-square coding unit), asymmetric type of nL×2N, nR×2N, 2N×nU, or 2N×nD.

Binary tree-based partitioning may be limitedly allowed to one of a symmetric or an asymmetric type partition. In this case, constructing the coding tree unit with square blocks may correspond to quad tree CU partitioning, and constructing the coding tree unit with symmetric non-square blocks may correspond to binary tree partitioning. Constructing the coding tree unit with square blocks and symmetric non-square blocks may correspond to quad and binary tree CU partitioning.

Binary tree-based partitioning may be performed on a coding block where quad tree-based partitioning is no longer performed. Quad tree-based partitioning may no longer be performed on the coding block partitioned based on the binary tree.

Furthermore, partitioning of a lower depth may be determined depending on a partition type of an upper depth. For example, if binary tree-based partitioning is allowed in two or more depths, only the same type as the binary tree partitioning of the upper depth may be allowed in the lower depth. For example, if the binary tree-based partitioning in the upper depth is performed with 2N×N type, the binary tree-based partitioning in the lower depth is also performed with 2N×N type. Alternatively, if the binary tree-based partitioning in the upper depth is performed with N×2N type, the binary tree-based partitioning in the lower depth is also performed with N×2N type.

On the contrary, it is also possible to allow, in a lower depth, only a type different from a binary tree partitioning type of an upper depth.

It may be possible to limit only a specific type of binary tree based partitioning to be used for sequence, slice, coding tree unit, or coding unit. As an example, only 2N×N type or N×2N type of binary tree-based partitioning may be allowed for the coding tree unit. An available partition type may be predefined in an encoder or a decoder. Or information on available partition type or on unavailable partition type on may be encoded and then signaled through a bitstream.

Figure 5A:
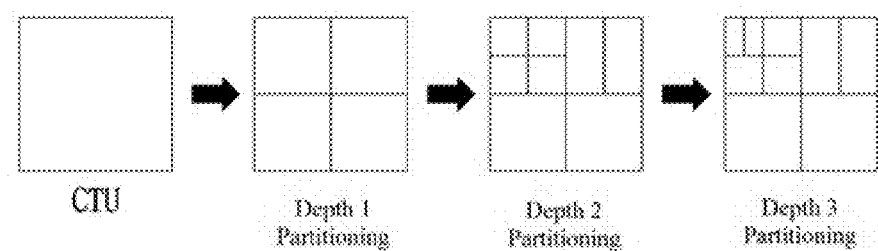
FIGS. 5A and 5B are diagrams illustrating an example in which only a binary tree-based partition of a pre-determined type is allowed according to an embodiment of the present invention.
Figure 5B:
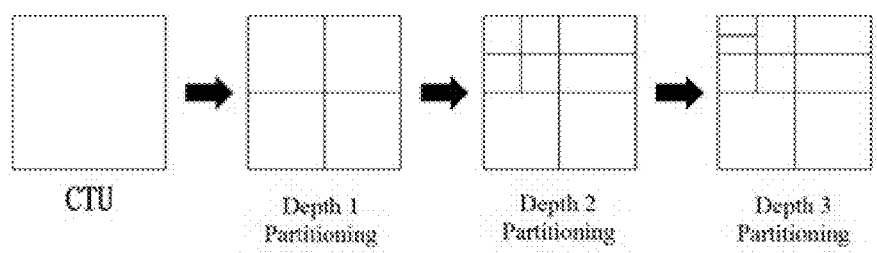

FIGS. 5A and 5B are diagrams illustrating an example in which only a specific type of binary tree-based partitioning is allowed. FIG. 5A shows an example in which only N×2N type of binary tree-based partitioning is allowed, and FIG. 5B shows an example in which only 2N×N type of binary tree-based partitioning is allowed. In order to implement adaptive partitioning based on the quad tree or binary tree, information indicating quad tree-based partitioning, information on the size/depth of the coding block that quad tree-based partitioning is allowed, information indicating binary tree-based partitioning, information on the size/depth of the coding block that binary tree-based partitioning is allowed, information on the size/depth of the coding block that binary tree-based partitioning is not allowed, information on whether binary tree-based partitioning is performed in a vertical direction or a horizontal direction, etc. may be used.

In addition, information on the number of times a binary tree partitioning is allowed, a depth at which the binary tree partitioning is allowed, or the number of the depths at which the binary tree partitioning is allowed may be obtained for a coding tree unit or a specific coding unit. The information may be encoded in units of a coding tree unit or a coding unit, and may be transmitted to a decoder through a bitstream.

For example, a syntax 'max_binary_depth_idx_minus1' indicating a maximum depth at which binary tree partitioning is allowed may be encoded/decoded through a bitstream. In this case, max_binary_depth_idx_minus1+1 may indicate the maximum depth at which the binary tree partitioning is allowed.

Figure 6:
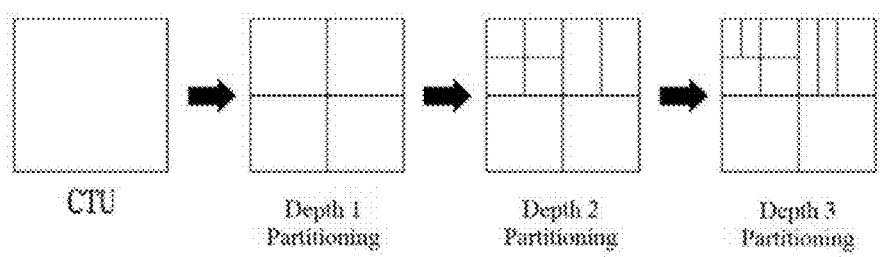
FIG. 6 is a diagram for explaining an example in which information related to the allowable number of binary tree partitioning is encoded/decoded, according to an embodiment to which the present invention is applied.

Referring to the example shown in FIG. 6, in FIG. 6, the binary tree partitioning has been performed for a coding unit having a depth of 2 and a coding unit having a depth of 3. Accordingly, at least one of information indicating the number of times the binary tree partitioning in the coding tree unit has been performed (i.e., 2 times), information indicating the maximum depth which the binary tree partitioning has been allowed in the coding tree unit (i.e., depth 3), or the number of depths in which the binary tree partitioning has been performed in the coding tree unit (i.e., 2 (depth 2 and depth 3)) may be encoded/decoded through a bitstream.

As another example, at least one of information on the number of times the binary tree partitioning is permitted, the depth at which the binary tree partitioning is allowed, or the number of the depths at which the binary tree partitioning is allowed may be obtained for each sequence or each slice. For example, the information may be encoded in units of a sequence, a picture, or a slice unit and transmitted through a bitstream. Accordingly, at least one of the number of the binary tree partitioning in a first slice, the maximum depth in which the binary tree partitioning is allowed in the first slice, or the number of depths in which the binary tree partitioning is performed in the first slice may be difference from a second slice. For example, in the first slice, binary tree partitioning may be permitted for only one depth, while in the second slice, binary tree partitioning may be permitted for two depths.

As another example, the number of times the binary tree partitioning is permitted, the depth at which the binary tree partitioning is allowed, or the number of depths at which the binary tree partitioning is allowed may be set differently according to a time level identifier (TemporalID) of a slice or a picture. Here, the temporal level identifier (TemporalID) is used to identify each of a plurality of layers of video having a scalability of at least one of view, spatial, temporal or quality.

As shown in FIG. 3, the first coding block 300 with the partition depth (split depth) of k may be partitioned into multiple second coding blocks based on the quad tree. For example, the second coding blocks 310 to 340 may be square blocks having the half width and the half height of the first coding block, and the partition depth of the second coding block may be increased to k+1.

The second coding block 310 with the partition depth of k+1 may be partitioned into multiple third coding blocks with the partition depth of k+2. Partitioning of the second coding block 310 may be performed by selectively using one of the quad tree and the binary tree depending on a partitioning method. Here, the partitioning method may be determined based on at least one of the information indicating quad tree-based partitioning and the information indicating binary tree-based partitioning.

When the second coding block 310 is partitioned based on the quad tree, the second coding block 310 may be partitioned into four third coding blocks 310a having the half width and the half height of the second coding block, and the partition depth of the third coding block 310a may be increased to k+2. In contrast, when the second coding block 310 is partitioned based on the binary tree, the second coding block 310 may be partitioned into two third coding blocks. Here, each of two third coding blocks may be a non-square block having one of the half width and the half height of the second coding block, and the partition depth may be increased to k+2. The second coding block may be determined as a non-square block of a horizontal direction or a vertical direction depending on a partitioning direction, and the partitioning direction may be determined based on the information on whether binary tree-based partitioning is performed in a vertical direction or a horizontal direction.

In the meantime, the second coding block 310 may be determined as a leaf coding block that is no longer partitioned based on the quad tree or the binary tree. In this case, the leaf coding block may be used as a prediction block or a transform block.

Like partitioning of the second coding block 310, the third coding block 310a may be determined as a leaf coding block, or may be further partitioned based on the quad tree or the binary tree.

In the meantime, the third coding block 310b partitioned based on the binary tree may be further partitioned into coding blocks 310b-2 of a vertical direction or coding blocks 310b-3 of a horizontal direction based on the binary tree, and the partition depth of the relevant coding blocks may be increased to k+3. Alternatively, the third coding block 310b may be determined as a leaf coding block 310b-1 that is no longer partitioned based on the binary tree. In this case, the coding block 310b-1 may be used as a prediction block or a transform block. However, the above partitioning process may be limitedly performed based on at least one of the information on the size/depth of the coding block that quad tree-based partitioning is allowed, the information on the size/depth of the coding block that binary tree-based partitioning is allowed, and the information on the size/depth of the coding block that binary tree-based partitioning is not allowed.

A number of a candidate that represent a size of a coding block may be limited to a predetermined number, or a size of a coding block in a predetermined unit may have a fixed value. As an example, the size of the coding block in a sequence or in a picture may be limited to have 256×256, 128×128, or 32×32. Information indicating the size of the coding block in the sequence or in the picture may be signaled through a sequence header or a picture header.

As a result of partitioning based on a quad tree and a binary tree, a coding unit may be represented as square or rectangular shape of an arbitrary size.

A coding block is encoded using at least one of a skip mode, intra prediction, inter prediction, or a skip method. Once a coding block is determined, a prediction block may be determined through predictive partitioning of the coding block. The predictive partitioning of the coding block may be performed by a partition mode (Part_mode) indicating a partition type of the coding block. A size or a shape of the prediction block may be determined according to the partition mode of the coding block. For example, a size of a prediction block determined according to the partition mode may be equal to or smaller than a size of a coding block.

Figure 7:
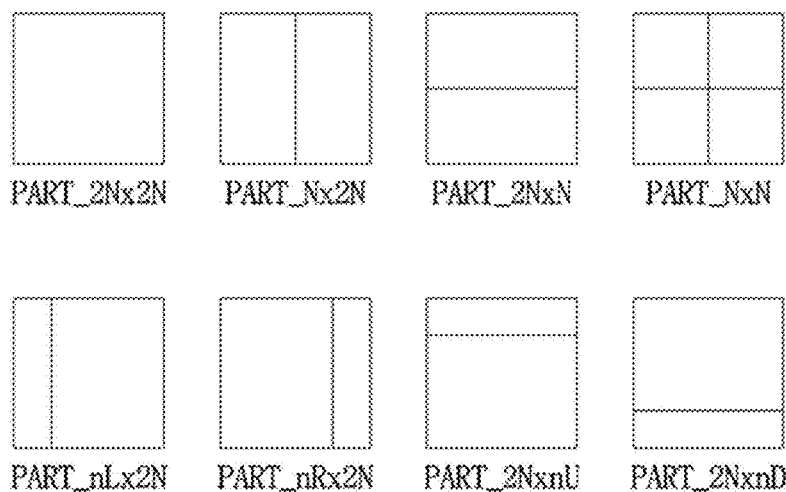
FIG. 7 is a diagram illustrating a partition mode applicable to a coding block according to an embodiment of the present invention.

FIG. 7 is a diagram illustrating a partition mode that may be applied to a coding block when the coding block is encoded by inter prediction.

When a coding block is encoded by inter prediction, one of 8 partitioning modes may be applied to the coding block, as in the example shown in FIG. 7.

When a coding block is encoded by intra prediction, a partition mode PART_2N×2N or a partition mode PART_N×N may be applied to the coding block.

PART_N×N may be applied when a coding block has a minimum size. Here, the minimum size of the coding block may be pre-defined in an encoder and a decoder. Or, information regarding the minimum size of the coding block may be signaled via a bitstream. For example, the minimum size of the coding block may be signaled through a slice header, so that the minimum size of the coding block may be defined per slice.

In general, a prediction block may have a size from 64×64 to 4×4. However, when a coding block is encoded by inter prediction, it may be restricted that the prediction block does not have a 4×4 size in order to reduce memory bandwidth when performing motion compensation.

Figure 8:
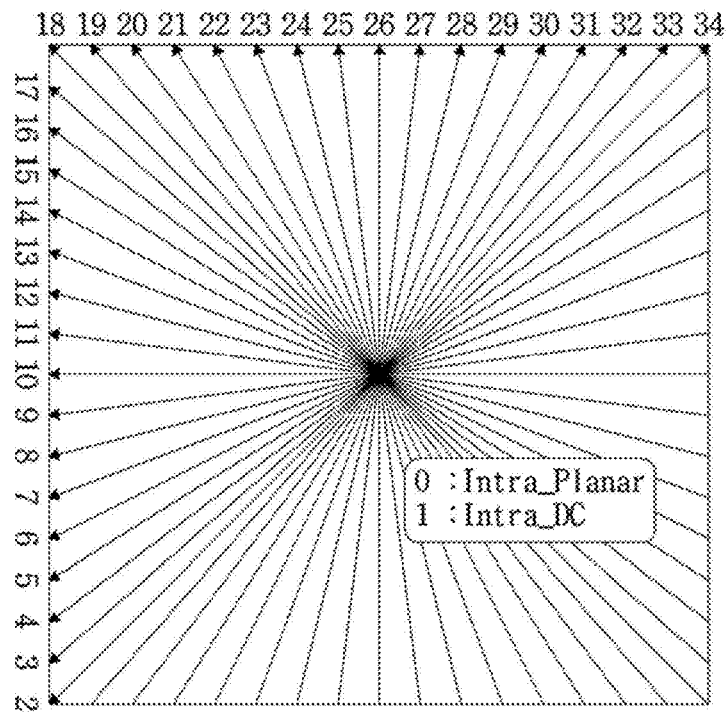
FIG. 8 is a diagram illustrating types of pre-defined intra prediction modes for a device for encoding/decoding a video according to an embodiment of the present invention.

FIG. 8 is a diagram illustrating types of pre-defined intra prediction modes for a device for encoding/decoding a video according to an embodiment of the present invention.

The device for encoding/decoding a video may perform intra prediction using one of pre-defined intra prediction modes. The pre-defined intra prediction modes for intra prediction may include non-directional prediction modes (e.g., a planar mode, a DC mode) and 33 directional prediction modes.

Alternatively, in order to enhance accuracy of intra prediction, a larger number of directional prediction modes than the 33 directional prediction modes may be used. That is, M extended directional prediction modes may be defined by subdividing angles of the directional prediction modes (M>33), and a directional prediction mode having a predetermined angle may be derived using at least one of the 33 pre-defined directional prediction modes.

A larger number of intra prediction modes than 35 intra prediction modes shown in FIG. 8 may be used. For example, a larger number of intra prediction modes than the 35 intra prediction modes can be used by subdividing angles of directional prediction modes or by deriving a directional prediction mode having a predetermined angle using at least one of a pre-defined number of directional prediction modes. At this time, the use of a larger number of intra prediction modes than the 35 intra prediction modes may be referred to as an extended intra prediction mode.

Figure 9:
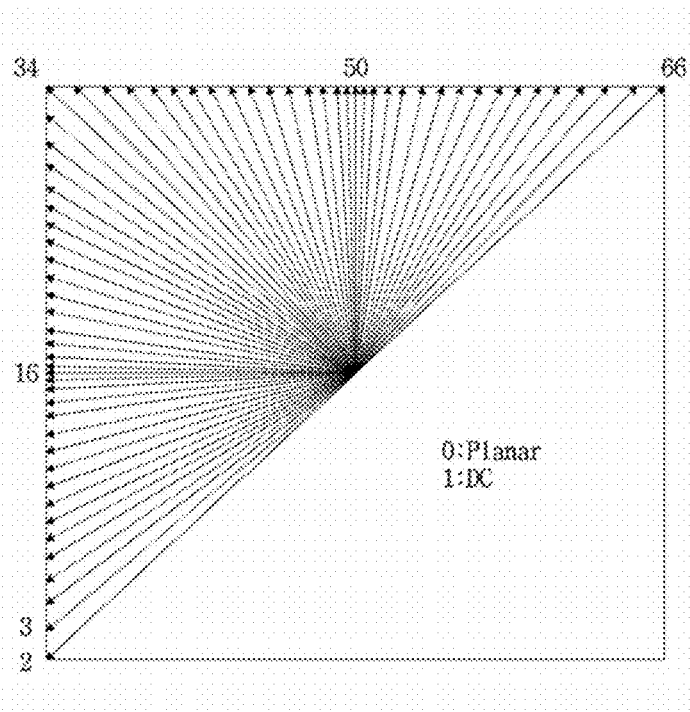
FIG. 9 is a diagram illustrating a kind of extended intra prediction modes according to an embodiment of the present invention.

FIG. 9 shows an example of extended intra prediction modes, and the extended intra prediction modes may include two non-directional prediction modes and 65 extended directional prediction modes. The same numbers of the extended intra prediction modes may be used for a luma component and a chroma component, or a different number of intra prediction modes may be used for each component. For example, 67 extended intra prediction modes may be used for the luma component, and 35 intra prediction modes may be used for the chroma component.

Alternatively, depending on the chroma format, a different number of intra prediction modes may be used in performing intra prediction. For example, in the case of the 4:2:0 format, 67 intra prediction modes may be used for the luma component to perform intra prediction and 35 intra prediction modes may be used for the chroma component. In the case of the 4:4:4 format, 67 intra prediction modes may be used for both the luma component and the chroma component to perform intra prediction.

Alternatively, depending on the size and/or shape of the block, a different number of intra prediction modes may be used to perform intra prediction. That is, depending on the size and/or shape of the PU or CU, 35 intra prediction modes or 67 intra prediction modes may be used to perform intra prediction. For example, when the CU or PU has the size less than 64×64 or is asymmetrically partitioned, 35 intra prediction modes may be used to perform intra prediction. When the size of the CU or PU is equal to or greater than 64×64, 67 intra prediction modes may be used to perform intra prediction. 65 directional intra prediction modes may be allowed for Intra 2N×2N, and only 35 directional intra prediction modes may be allowed for Intra N×N.

A size of a block to which the extended intra prediction mode is applied may be set differently for each sequence, picture or slice. For example, it is set that the extended intra prediction mode is applied to a block (e.g., CU or PU) which has a size greater than 64×64 in the first slice. On the other hands, it is set that the extended intra prediction mode is applied to a block which has a size greater than 32×32 in the second slice. Information representing a size of a block to which the extended intra prediction mode is applied may be signaled through in units of a sequence, a picture, or a slice. For example, the information indicating the size of the block to which the extended intra prediction mode is applied may be defined as 'log 2_extended_intra_mode_size_minus4' obtained by taking a logarithm of the block size and then subtracting the integer 4. For example, if a value of log 2_extended_intra_mode_size_minus4 is 0, it may indicate that the extended intra prediction mode may be applied to a block having a size equal to or greater than 16×16. And if a value of log 2_extended_intra_mode_size_minus4 is 1, it may indicate that the extended intra prediction mode may be applied to a block having a size equal to or greater than 32×32.

As described above, the number of intra prediction modes may be determined in consideration of at least one of a color component, a chroma format, and a size or a shape of a block. In addition, the number of intra prediction mode candidates (e.g., the number of MPMs) used for determining an intra prediction mode of a current block to be encoded/decoded may also be determined according to at least one of a color component, a color format, and the size or a shape of a block. A method of determining an intra prediction mode of a current block to be encoded/decoded and a method of performing intra prediction using the determined intra prediction mode will be described with the drawings.

Figure 10:
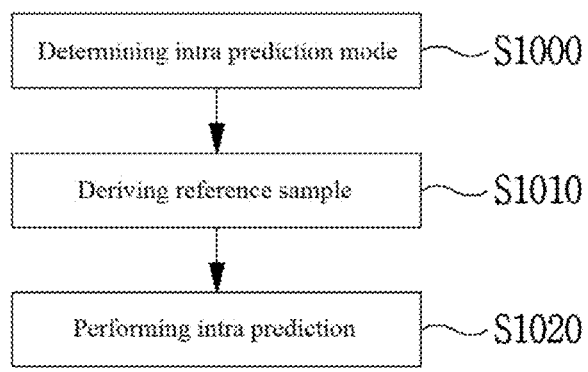
FIG. 10 is a flowchart briefly illustrating an intra prediction method according to an embodiment of the present invention.

FIG. 10 is a flowchart briefly illustrating an intra prediction method according to an embodiment of the present invention.

Referring to FIG. 10, an intra prediction mode of the current block may be determined at step S1000.

Specifically, the intra prediction mode of the current block may be derived based on a candidate list and an index. Here, the candidate list contains multiple candidates, and the multiple candidates may be determined based on an intra prediction mode of the neighboring block adjacent to the current block. The neighboring block may include at least one of blocks positioned at the top, the bottom, the left, the right, and the corner of the current block. The index may specify one of the multiple candidates of the candidate list. The candidate specified by the index may be set to the intra prediction mode of the current block.

An intra prediction mode used for intra prediction in the neighboring block may be set as a candidate. Also, an intra prediction mode having directionality similar to that of the intra prediction mode of the neighboring block may be set as a candidate. Here, the intra prediction mode having similar directionality may be determined by adding or subtracting a predetermined constant value to or from the intra prediction mode of the neighboring block. The predetermined constant value may be an integer, such as one, two, or more.

The candidate list may further include a default mode. The default mode may include at least one of a planar mode, a DC mode, a vertical mode, and a horizontal mode. The default mode may be adaptively added considering the maximum number of candidates that can be included in the candidate list of the current block.

The maximum number of candidates that can be included in the candidate list may be three, four, five, six, or more. The maximum number of candidates that can be included in the candidate list may be a fixed value preset in the device for encoding/decoding a video, or may be variably determined based on a characteristic of the current block. The characteristic may mean the location/size/shape of the block, the number/type of intra prediction modes that the block can use, a color type, a color format, etc. Alternatively, information indicating the maximum number of candidates that can be included in the candidate list may be signaled separately, and the maximum number of candidates that can be included in the candidate list may be variably determined using the information. The information indicating the maximum number of candidates may be signaled in at least one of a sequence level, a picture level, a slice level, and a block level.

When the extended intra prediction modes and the 35 pre-defined intra prediction modes are selectively used, the intra prediction modes of the neighboring blocks may be transformed into indexes corresponding to the extended intra prediction modes, or into indexes corresponding to the 35 intra prediction modes, whereby candidates can be derived. For transform to an index, a pre-defined table may be used, or a scaling operation based on a predetermined value may be used. Here, the pre-defined table may define a mapping relation between different intra prediction mode groups (e.g., extended intra prediction modes and 35 intra prediction modes).

For example, when the left neighboring block uses the 35 intra prediction modes and the intra prediction mode of the left neighboring block is 10 (a horizontal mode), it may be transformed into an index of 16 corresponding to a horizontal mode in the extended intra prediction modes.

Alternatively, when the top neighboring block uses the extended intra prediction modes and the intra prediction mode the top neighboring block has an index of 50 (a vertical mode), it may be transformed into an index of 26 corresponding to a vertical mode in the 35 intra prediction modes.

Based on the above-described method of determining the intra prediction mode, the intra prediction mode may be derived independently for each of the luma component and the chroma component, or the intra prediction mode of the chroma component may be derived depending on the intra prediction mode of the luma component.

Specifically, the intra prediction mode of the chroma component may be determined based on the intra prediction mode of the luma component as shown in the following Table 1.

TABLE 1

| | IntraPredModeY[xCb][yCb] | | | | |
|---|---|---|---|---|---|
| Intra_chroma_pred_mode[xCb][yCb] | 0 | 26 | 10 | 1 | X(0 <= X <= 34) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X |

In Table 1, intra_chroma_pred_mode means information signaled to specify the intra prediction mode of the chroma component, and IntraPredModeY indicates the intra prediction mode of the luma component.

Referring to FIG. 10, a reference sample for intra prediction of the current block may be derived at step S1010.

Specifically, a reference sample for intra prediction may be derived based on a neighboring sample of the current block. The neighboring sample may be a reconstructed sample of the neighboring block, and the reconstructed sample may be a reconstructed sample before an in-loop filter is applied or a reconstructed sample after the in-loop filter is applied.

A neighboring sample reconstructed before the current block may be used as the reference sample, and a neighboring sample filtered based on a predetermined intra filter may be used as the reference sample. Filtering of neighboring samples using an intra filter may also be referred to as reference sample smoothing. The intra filter may include at least one of the first intra filter applied to multiple neighboring samples positioned on the same horizontal line and the second intra filter applied to multiple neighboring samples positioned on the same vertical line. Depending on the positions of the neighboring samples, one of the first intra filter and the second intra filter may be selectively applied, or both intra filters may be applied. At this time, at least one filter coefficient of the first intra filter or the second intra filter may be (1, 2, 1), but is not limited thereto.

Filtering may be adaptively performed based on at least one of the intra prediction mode of the current block and the size of the transform block for the current block. For example, when the intra prediction mode of the current block is the DC mode, the vertical mode, or the horizontal mode, filtering may not be performed. When the size of the transform block is N×M, filtering may not be performed. Here, N and M may be the same values or different values, or may be values of 4, 8, 16, or more. For example, if the size of the transform block is 4×4, filtering may not be performed. Alternatively, filtering may be selectively performed based on the result of a comparison of a pre-defined threshold and the difference between the intra prediction mode of the current block and the vertical mode (or the horizontal mode). For example, when the difference between the intra prediction mode of the current block and the vertical mode is greater than a threshold, filtering may be performed. The threshold may be defined for each size of the transform block as shown in Table 2.

TABLE 2

| | 8 × 8 transform | 16 × 16 transform | 32 × 32 transform |
|---|---|---|---|
| Threshold | 7 | 1 | 0 |

The intra filter may be determined as one of multiple intra filter candidates pre-defined in the device for encoding/decoding a video. To this end, an index specifying an intra filter of the current block among the multiple intra filter candidates may be signaled. Alternatively, the intra filter may be determined based on at least one of the size/shape of the current block, the size/shape of the transform block, information on the filter strength, and variations of the neighboring samples.

Referring to FIG. 10, intra prediction may be performed using the intra prediction mode of the current block and the reference sample at step S1020.

That is, the prediction sample of the current block may be obtained using the intra prediction mode determined at step S1000 and the reference sample derived at step S1010. However, in the case of intra prediction, a boundary sample of the neighboring block may be used, and thus quality of the prediction picture may be decreased. Therefore, a correction process may be performed on the prediction sample generated through the above-described prediction process, and will be described in detail with reference to FIGS. 11 to 13. However, the correction process is not limited to being applied only to the intra prediction sample, and may be applied to an inter prediction sample or the reconstructed sample.

Figure 11:
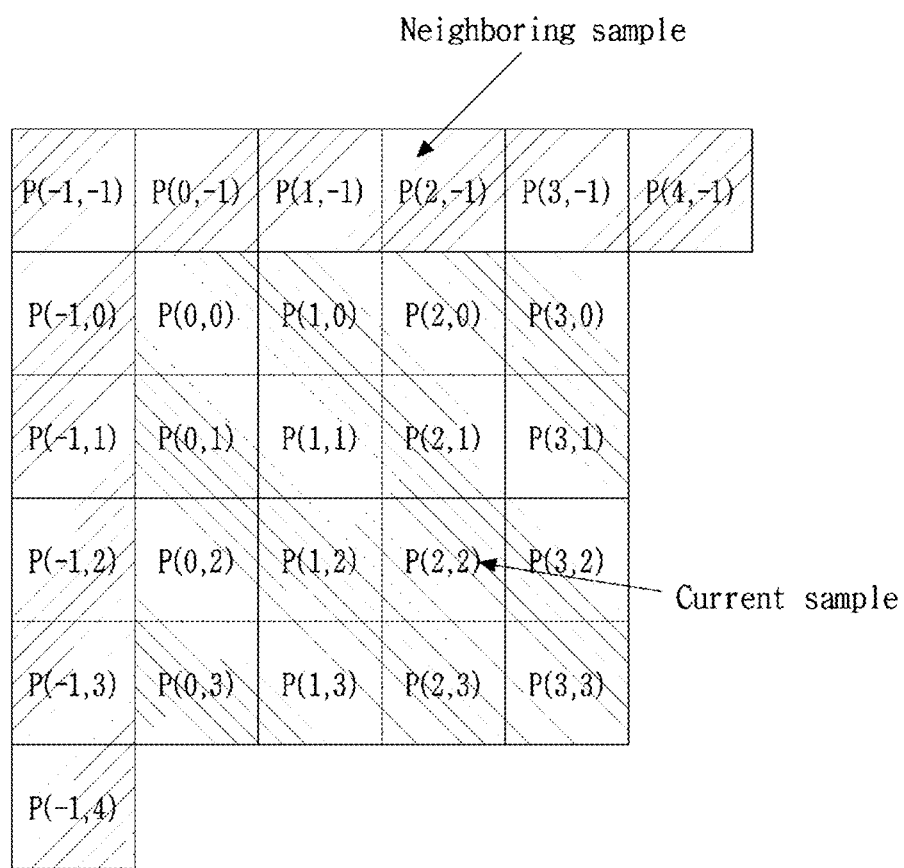
FIG. 11 is a diagram illustrating a method of correcting a prediction sample of a current block based on differential information of neighboring samples according to an embodiment of the present invention.

FIG. 11 is a diagram illustrating a method of correcting a prediction sample of a current block based on differential information of neighboring samples according to an embodiment of the present invention.

The prediction sample of the current block may be corrected based on the differential information of multiple neighboring samples for the current block. The correction may be performed on all prediction samples in the current block, or may be performed on prediction samples in pre-determined partial regions. The partial regions may be one row/column or multiple rows/columns, and these may be preset regions for correction in the device for encoding/decoding a video. For example, correction may be performed on a one row/column located at a boundary of the current block or may be performed on plurality of rows/columns from a boundary of the current block. Alternatively, the partial regions may be variably determined based on at least one of the size/shape of the current block and the intra prediction mode.

The neighboring samples may belong to the neighboring blocks positioned at the top, the left, and the top left corner of the current block. The number of neighboring samples used for correction may be two, three, four, or more. The positions of the neighboring samples may be variably determined depending on the position of the prediction sample which is the correction target in the current block. Alternatively, some of the neighboring samples may have fixed positions regardless of the position of the prediction sample which is the correction target, and the remaining neighboring samples may have variable positions depending on the position of the prediction sample which is the correction target.

The differential information of the neighboring samples may mean a differential sample between the neighboring samples, or may mean a value obtained by scaling the differential sample by a predetermined constant value (e.g., one, two, three, etc.). Here, the predetermined constant value may be determined considering the position of the prediction sample which is the correction target, the position of the column or row including the prediction sample which is the correction target, the position of the prediction sample within the column or row, etc.

For example, when the intra prediction mode of the current block is the vertical mode, differential samples between the top left neighboring sample p(−1, −1) and neighboring samples p (−1, y) adjacent to the left boundary of the current block may be used to obtain the final prediction sample as shown in Equation 1.

$$P'(0,y)=P(0,y)+((p(-1,y)-p(-1,-1))>>1 \text{ for } y=0 \ldots N-1 \quad \text{[Equation 1]}$$

For example, when the intra prediction mode of the current block is the horizontal mode, differential samples between the top left neighboring sample p(−1, −1) and neighboring samples p(x, −1) adjacent to the top boundary of the current block may be used to obtain the final prediction sample as shown in Equation 2.

$$P'(x,0)=p(x,0)+((p)(x,-1)-p(-1,-1))>>1 \text{ for } x=0 \ldots N-1 \quad \text{[Equation 2]}$$

For example, when the intra prediction mode of the current block is the vertical mode, differential samples between the top left neighboring sample p(−1, −1) and neighboring samples p(−1, y) adjacent to the left boundary of the current block may be used to obtain the final prediction sample. Here, the differential sample may be added to the prediction sample, or the differential sample may be scaled by a predetermined constant value, and then added to the prediction sample. The predetermined constant value used in scaling may be determined differently depending on the column and/or row. For example, the prediction sample may be corrected as shown in Equation 3 and Equation 4.

$$P'(0,y)=P(0,y)+((p(-1,y)-p(-1,-1))>>1 \text{ for } y=0 \ldots N-1 \quad \text{[Equation 3]}$$

$$P'(1,y)=P(1,y)+((p(-1,y)-p(-1,-1))>>2 \text{ for } y=0 \ldots N-1 \quad \text{[Equation 4]}$$

For example, when the intra prediction mode of the current block is the horizontal mode, differential samples between the top left neighboring sample p(−1, −1) and neighboring samples p(x, −1) adjacent to the top boundary of the current block may be used to obtain the final prediction sample, as described in the case of the vertical mode. For example, the prediction sample may be corrected as shown in Equation 5 and Equation 6.

$$P'(x,0)=p(x,0)+((p)(x,-1)-p(-1,-1))>>1 \text{ for } x=0 \ldots N-1$$ [Equation 5]

$$P'(x,1)=p(x,1)+((p)(x,-1)-p(-1,-1))>>2 \text{ for } x=0 \ldots N-1$$ [Equation 6]

Figure 12:
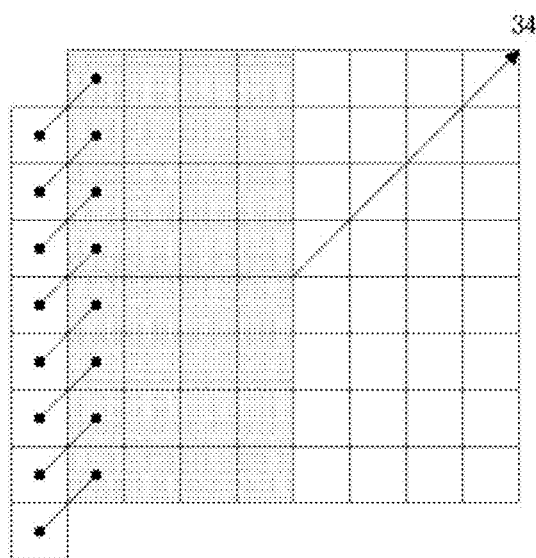
FIGS. 12 and 13 are diagrams illustrating a method of correcting a prediction sample based on a predetermined correction filter according to an embodiment of the present invention.
Figure 13:
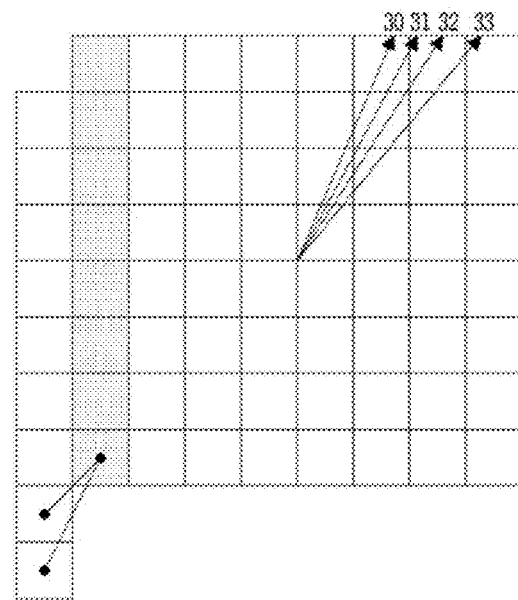

FIGS. 12 and 13 are diagrams illustrating a method of correcting a prediction sample based on a predetermined correction filter according to an embodiment of the present invention.

The prediction sample may be corrected based on the neighboring sample of the prediction sample which is the correction target and a predetermined correction filter. Here, the neighboring sample may be specified by an angular line of the directional prediction mode of the current block, or may be at least one sample positioned on the same angular line as the prediction sample which is the correction target. Also, the neighboring sample may be a prediction sample in the current block, or may be a reconstructed sample in a neighboring block reconstructed before the current block.

At least one of the number of taps, strength, and a filter coefficient of the correction filter may be determined based on at least one of the position of the prediction sample which is the correction target, whether or not the prediction sample which is the correction target is positioned on the boundary of the current block, the intra prediction mode of the current block, angle of the directional prediction mode, the prediction mode (inter or intra mode) of the neighboring block, and the size/shape of the current block.

Referring to FIG. 12, when the directional prediction mode has an index of 2 or 34, at least one prediction/reconstructed sample positioned at the bottom left of the prediction sample which is the correction target and the predetermined correction filter may be used to obtain the final prediction sample. Here, the prediction/reconstructed sample at the bottom left may belong to a previous line of a line including the prediction sample which is the correction target. The prediction/reconstructed sample at the bottom left may belong to the same block as the current sample, or to neighboring block adjacent to the current block.

Filtering for the prediction sample may be performed only on the line positioned at the block boundary, or may be performed on multiple lines. The correction filter where at least one of the number of filter taps and a filter coefficient is different for each of lines may be used. For example, a (½, ½) filter may be used for the left first line closest to the block boundary, a (12/16, 4/16) filter may be used for the second line, a (14/16, 2/16) filter may be used for the third line, and a (15/16, 1/16) filter may be used for the fourth line.

Alternatively, when the directional prediction mode has an index of 3 to 6 or 30 to 33, filtering may be performed on the block boundary as shown in FIG. 13, and a 3-tap correction filter may be used to correct the prediction sample. Filtering may be performed using the bottom left sample of the prediction sample which is the correction target, the bottom sample of the bottom left sample, and a 3-tap correction filter that takes as input the prediction sample which is the correction target. The position of neighboring sample used by the correction filter may be determined differently based on the directional prediction mode. The filter coefficient of the correction filter may be determined differently depending on the directional prediction mode.

Different correction filters may be applied depending on whether the neighboring block is encoded in the inter mode or the intra mode. When the neighboring block is encoded in the intra mode, a filtering method where more weight is given to the prediction sample may be used, compared to when the neighboring block is encoded in the inter mode. For example, in the case of that the intra prediction mode is 34, when the neighboring block is encoded in the inter mode, a (½, ½) filter may be used, and when the neighboring block is encoded in the intra mode, a (4/16, 12/16) filter may be used.

The number of lines to be filtered in the current block may vary depending on the size/shape of the current block (e.g., the coding block or the prediction block). For example, when the size of the current block is equal to or less than 32×32, filtering may be performed on only one line at the block boundary; otherwise, filtering may be performed on multiple lines including the one line at the block boundary.

FIGS. 12 and 13 are based on the case where the 35 intra prediction modes in FIG. 7 are used, but may be equally/similarly applied to the case where the extended intra prediction modes are used.

Figure 14:
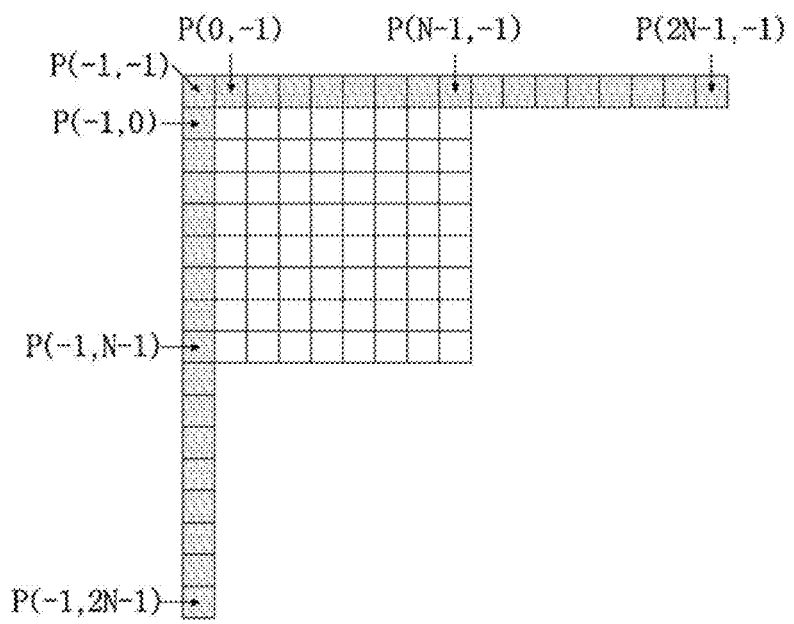
FIG. 14 shows a range of reference samples for intra prediction according to an embodiment to which the present invention is applied.

FIG. 14 shows a range of reference samples for intra prediction according to an embodiment to which the present invention is applied.

Intra prediction of a current block may be performed using a reference sample derived based on a reconstructed sample included in a neighboring block. Here, the reconstructed sample means that encoding/decoding is completed before encoding/decoding the current block. For example, intra prediction for the current block may be performed based on at least one of reference samples P(−1, −1), P(−1, y) (0<=y<=2N−1) and P (x, −1) (0<=x<=2N−1). At this time, filtering on reference samples is selectively performed based on at least one of an intra prediction mode (e.g., index, directionality, angle, etc. of the intra prediction mode) of the current block or a size of a transform block related to the current block.

Filtering on reference samples may be performed using an intra filter pre-defined in an encoder and a decoder. For example, an intra filter with a filter coefficient of (1,2,1) or an intra filter with a filter coefficient of (2,3,6,3,2) may be used to derive final reference samples for use in intra prediction.

Alternatively, at least one of a plurality of intra filter candidates may be selected to perform filtering on reference samples. Here, the plurality of intra filter candidates may differ from each other in at least one of a filter strength, a filter coefficient or a tap number (e.g., a number of filter coefficients, a filter length). A plurality of intra filter candidates may be defined in at least one of a sequence, a picture, a slice, or a block level. That is, a sequence, a picture, a slice, or a block in which the current block is included may use the same plurality of intra filter candidates.

Hereinafter, for convenience of explanation, it is assumed that a plurality of intra filter candidates includes a first intra filter and a second intra filter. It is also assumed that the first intra filter is a (1,2,1) 3-tap filter and the second intra filter is a (2,3,6,3,2) 5-tap filter.

When reference samples are filtered by applying a first intra filter, the filtered reference samples may be derived as shown in Equation 7.

$$P(-1,-1)=(P(-1,0)+2P(-1,-1)+P(0,-1)+2)>>2$$

$$P(-1,y)=(P(-1,y+1)+2P(-1,y)+P(-1,y-1)+2)>>2$$

$$P(x,-1)=P(x+1,-1)+2P(x,-1)+P(x-1,-1)+2)>>2 \quad \text{[Equation 7]}$$

When reference samples are filtered by applying the second intra filter, the filtered reference samples may be derived as shown in the following equation 8.

$$P(-1,-1)=(2P(-2,0)+3P(-1,0)+6P(-1,-1)+3P(0,-1)+2P(0,-2)+8))>>4$$

$$P(-1,y)=(2P(-1,y+2)+3P(-1,y+1)+6P(-1,y)+3P(-1,y-2)+8)>>4$$

$$P(x,-1)=2P(x+2,-1)+3P(x+1,-1)+6P(x,-1)+3P(x-1,-1)+2P(x-2,-1)+8)>>4 \quad \text{[Equation 8]}$$

In the above Equations 7 and 8, x may be an integer between 0 and 2N−2, and y may be an integer between 0 and 2N−2.

Figure 15:
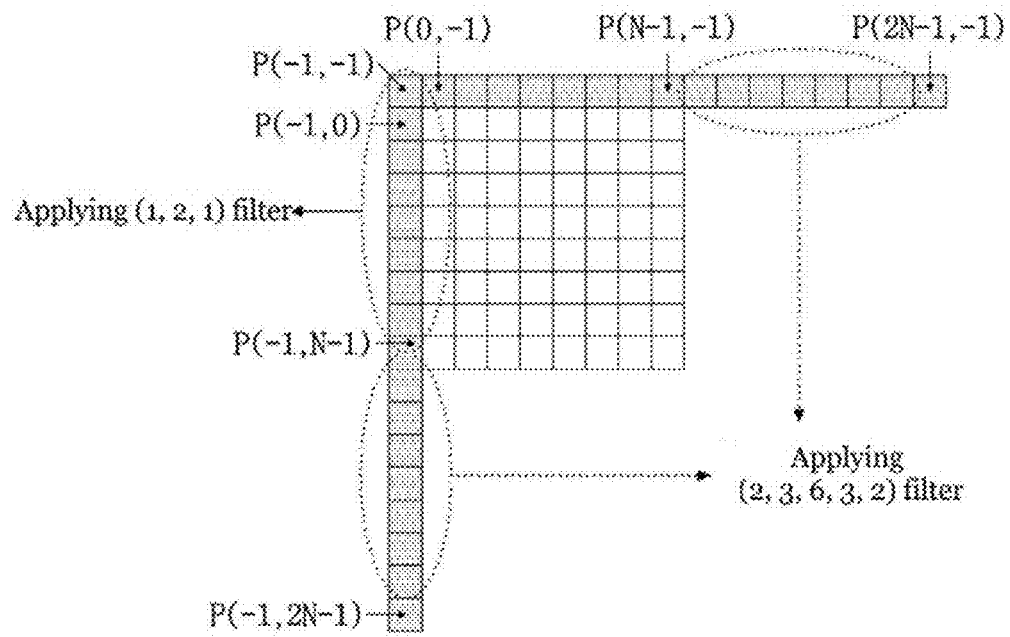
FIGS. 15 to 17 illustrate an example of filtering on reference samples according to an embodiment of the present invention.

Alternatively, based on a position of a reference sample, one of a plurality of intra filter candidates may be determined, and filtering on the reference sample may be performed by using the determined one. For example, a first intra filter may be applied to reference samples included in a first range, and a second intra filter may be applied to reference samples included in a second range. Here, the first range and the second range may be distinguished based on whether they are adjacent to a boundary of a current block, whether they are located at a top side or a left side of a current block, or whether they are adjacent to a corner of a current block. For example, as shown in FIG. 15, filtering on reference samples (P (−1, −1), P (−1,0), P (−1,1), . . . , P (−1, N−1) and P (0, −1), P (1, −1), . . . ) which are adjacent to a boundary of the current block is performed by applying a first intra filter as shown in Equation 7, and filtering on the other reference samples which are not adjacent to a boundary of the current block is performed by applying a second reference filter as shown in Equation 8. It is possible to select one of a plurality of intra filter candidates based on a transform type used for a current block, and perform filtering on reference samples using the selected one. Here, the transform type may mean (1) a transform scheme such as DCT, DST or KLT, (2) a transform mode indicator such as a 2D transform, 1D transform or non-transform or (3) the number of transforms such as a first transform and a second transform. Hereinafter, for convenience of description, it is assumed that the transform type means the transform scheme such as DCT, DST and KLT.

For example, if a current block is encoded using a DCT, filtering may be performed using a first intra filter, and if a current block is encoded using a DST, filtering may be performed using a second intra filter. Or, if a current block is encoded using DCT or DST, filtering may be performed using a first intra filter, and if the current block is encoded using a KLT, filtering may be performed using a second intra filter.

Filtering may be performed using a filter selected based on a transform type of a current block and a position of a reference sample. For example, if a current block is encoded using the a DCT, filtering on reference samples P (−1, −1), P (−1,0), P (−1,1), . . . , P (−1, N−1) and P (0, −1), P (1, −1), . . . , P (N−1, −1) may be performed by using a first intra filter, and filtering on other reference samples may be performed by using a second intra filter. If a current block is encoded using a DST, filtering on reference samples P (−1, −1), P (−1,0), P (−1,1), . . . , P (−1, N−1) and P (0, −1), P (1, −1), . . . , P (N−1, −1) may be performed by using a second intra filter, and filtering on other reference samples may be performed by using a first intra filter.

One of a plurality of intra filter candidates may be selected based on whether a transform type of a neighboring block including a reference sample is the same as a transform type of a current block, and the filtering may be performed using the selected intra filter candidate. For example, when a current block and a neighboring block use the same transform type, filtering is performed using a first intra filter, and when transform types of a current block and of a neighboring block are different from each other, the second intra filter may be used to perform filtering.

It is possible to select any one of a plurality of intra filter candidates based on a transform type of a neighboring block and perform filtering on a reference sample using the selected one. That is, a specific filter may be selected in consideration of a transform type of a block in which a reference sample is included. For example, as shown in FIG. 16, if a block adjacent to left/lower left of a current block is a block encoded using a DCT, and a block adjacent to top/top right of a current block is a block encoded using a DST, filtering on reference samples adjacent to left/lower left of a current block is performed by applying a first intra filter and filtering on reference samples adjacent to top/top right of a current block is performed by applying a second intra filter.

In units of a predetermined region, a filter usable in the corresponding region may be defined. Herein, the unit of the predetermined region may be any one of a sequence, a picture, a slice, a block group (e.g., a row of coding tree units) or a block (e.g., a coding tree unit) Or, another region may be defined that shares one or more filters. A reference sample may be filtered by using a filter mapped to a region in which a current block is included.

Figures 16, 17:
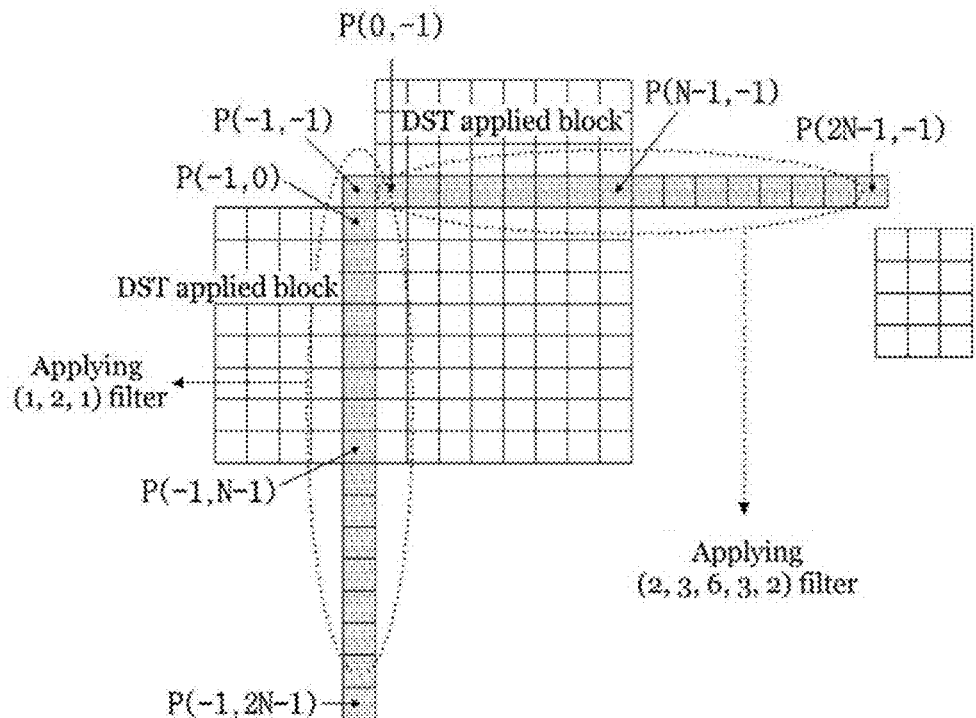

For example, as shown in FIG. 17, it is possible to perform filtering on reference samples using different filters in CTU units. In this case, information indicating whether the same filter is used in a sequence or a picture, a type of filter used for each CTU, an index specifying a filter used in the corresponding CTU among an available intra filter candidates may be signaled via a sequence parameter set (SPS) or a picture parameter set (PPS).

The above-described intra filter may be applied in units of a coding unit. For example, filtering may be performed by applying a first intra filter or a second intra filter to reference samples around a coding unit.

When a directional prediction mode or DC mode is used, deterioration of image quality may occur at a block boundary. On the other hand, in planar mode, there is an advantage that the deterioration of image quality at the block boundary is relatively small as compared with the above prediction modes.

Planar prediction may be performed by generating first prediction image (i.e., a first prediction sample) in a horizontal direction and second prediction image (i.e., a second prediction sample) in a vertical direction using reference samples and then performing a weighted prediction of the first prediction image and the second prediction image.

Here, the first prediction image may be generated based on reference samples which are adjacent to the current block and positioned in the horizontal direction of a prediction sample. For example, the first prediction image may be generated based on a weighted sum of reference samples positioned in the horizontal direction of the prediction sample, and a weight applied to each of the reference samples may be determined based on a distance from a prediction target sample or a size of the current block. The samples positioned in the horizontal direction may include a left reference sample located on a left side of the prediction target sample and a right reference sample located on a right side of the prediction target sample. At this time, the right reference sample may be derived from a top reference sample of the current block. For example, the right reference sample may be derived by copying a value of one of top reference samples, or may be derived by a weighted sum or an average value of top reference samples. Here, the top reference sample may be a reference sample located on the same vertical line as the right reference sample, and may be a reference sample adjacent to a top right corner of the current block. Alternatively, the position of the top reference sample may be determined differently depending on a position of the prediction target sample.

The second prediction image may be generated based on reference samples which are adjacent to the current block and positioned in a vertical direction of a prediction sample. For example, the second prediction image may be generated based on a weighted sum of reference samples positioned in the vertical direction of the prediction sample, and a weight applied to each of the reference samples may be determined based on a distance from a prediction target sample or a size of the current block. The samples located in the vertical direction may include a top reference sample located on a top side of the prediction target sample and a bottom reference sample located on a bottom side of the prediction target sample. At this time, the bottom reference sample may be derived from a left reference sample of the current block. For example, the bottom reference sample may be derived by copying a value of one of left reference samples, or may be derived by a weighted sum or an average value of left reference samples. Here, the left reference sample may be a reference sample located on the same horizontal line as the bottom reference sample, and may be a reference sample adjacent to a bottom left corner of the current block. Alternatively, the position of the top reference sample may be determined differently depending on a position of the prediction target sample.

As another example, it is also possible to derive the right reference sample and the bottom reference sample using a plurality of reference samples.

For example, the right reference sample or the bottom reference sample may be derived using both the top reference sample and the left reference sample of the current block. For example, at least one of the right reference sample or the bottom reference sample may be determined as a weighted sum or an average of the top reference sample and the left reference sample of the current block.

Alternatively, the weighted sum or the average of the top reference sample and the left reference sample of the current block may be calculated, and then the right reference sample may be derived from the weighted sum or the average value of the calculated value and the top reference sample. If the right reference sample is derived through calculation of the weighted sum of the calculated value and the top reference sample, the weight may be determined in a consideration of a size of the current block, a shape of the current block, a position of the right reference sample, or a distance between the right reference sample and the top reference sample.

In addition, after calculating the weighted sum or the average of the top reference sample and the left reference sample of the current block, the bottom reference sample may be derived from the weighted sum or the average value of the calculated value and the left reference sample. If the right reference sample is derived through the weighted sum of the calculated value and the left reference sample, the weight may be determined in a consideration of a size of the current block, a shape of the current block, a position of the bottom reference sample, or a distance between the bottom reference sample and the left reference sample.

Positions of multiple reference samples used to derive the right reference sample or the left reference sample may be fixed or may vary depending on a position of a prediction target sample. For example, the top reference sample may have a fixed position such as a reference sample adjacent to the top right corner of the current block and located on the same vertical line as the right reference sample, and the left reference sample may have a fixed position such as a reference sample adjacent to a bottom left corner of the current block and located on the same horizontal line as the bottom reference sample. Alternatively, when deriving the right reference sample, the top reference sample which has a fixed location such as a reference sample adjacent to the top right corner of the current block is used, while the left reference sample such as a reference sample located on the same horizontal line as the prediction target sample is used. When deriving the bottom reference sample, the left reference sample which has a fixed location such as a reference sample adjacent to the bottom left corner of the current block is used, while the top reference sample such as a reference sample located on the same vertical line as the prediction target sample is used.

Figure 18A:
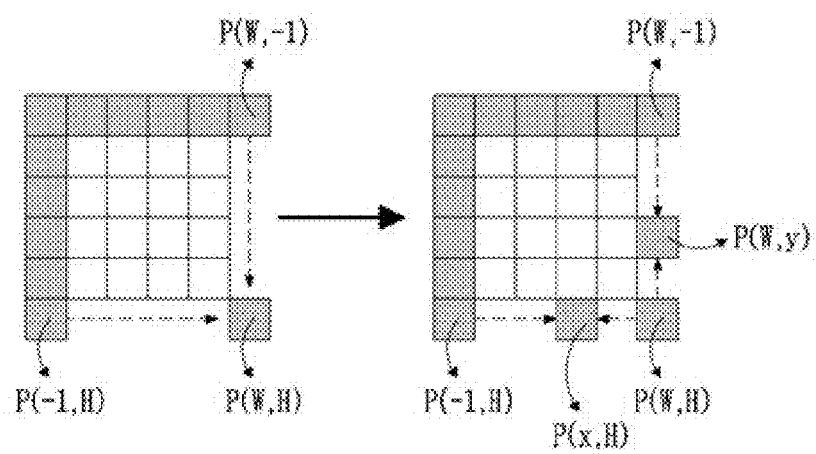
FIGS. 18A and 18B are diagrams showing an example of deriving a right reference sample or a bottom reference sample using a plurality of reference samples.
Figure 18B:
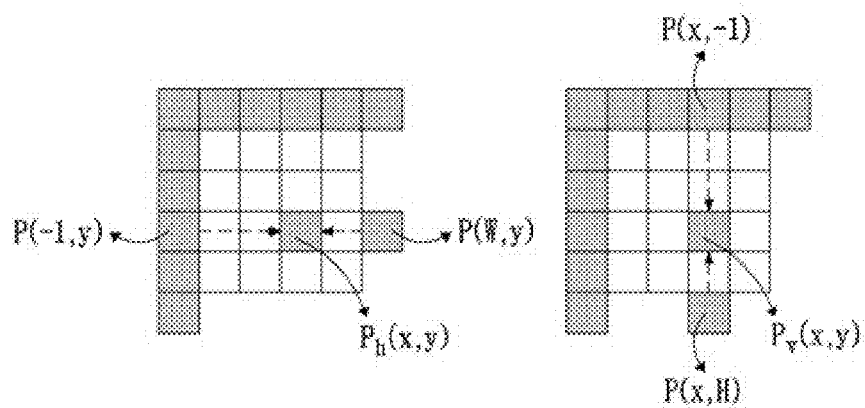

FIGS. 18A and 18B are diagrams showing an example of deriving a right reference sample or a bottom reference sample using a plurality of reference samples. It will be assumed that a current block is a block having a size of W×H.

Referring to FIG. 18A, first, a bottom right reference sample P(W, H) may be generated based on a weighted sum or an average value of a top reference sample P(W, −1) and a left reference sample P(−1, H) of the current block. And, a right reference sample P(W, y) for a prediction target sample (x, y) may be generated based on the bottom right reference sample P(W, H) and the top reference sample P(W, −1). For example, the right prediction sample P(W, y) may be calculated as a weighted sum or an average value of the bottom right reference sample P(W, H) and the top reference sample P(W, −1). In addition, a bottom reference sample P(x,H) for the prediction target sample (x, y) may be generated based on the bottom right reference sample P(W, H) and a left reference sample P(−1, H). For example, the bottom reference sample P(x, H) may be calculated as a weighted sum or an average value of the bottom right reference sample P(W, H) and the left reference sample P(−1, H).

As shown FIG. 18B, if the right reference sample and the bottom reference sample are generated, a first prediction sample $P_h(x, y)$ and a second prediction sample $P_v(x, y)$ for the prediction target block may be generated based on the generated reference samples. At this time, the first prediction sample $P_h(x, y)$ may be generated based on a weighted sum of the left reference sample P(−1, y) and the right reference sample P(W, y) and the second prediction sample may be generated based on a weighted sum of the top reference sample P(x, −1) and the bottom reference sample P(x, H).

Positions of reference samples used to generate the first prediction image and the second prediction image may vary depending on a size or a shape of the current block. That is, positions of the top reference sample or the left reference sample used to derive the right reference sample or the bottom reference sample may vary depending on the size or the shape of the current block.

For example, if the current block is a square block of N×N size, the right reference sample may be derived from P (N, −1) and the bottom reference sample may be derived from P(−1, N). Alternatively, the right reference sample and the bottom reference sample may be derived based on at least one of a weighted sum, an average value, a minimum value, or a maximum value of P(N, −1) and P (−1, N). On the other hand, if the current block is a non-square block, positions of the reference samples used to derive the right reference sample and the bottom reference samples may be determined differently, depending on the shape of the current block.

Figure 19:
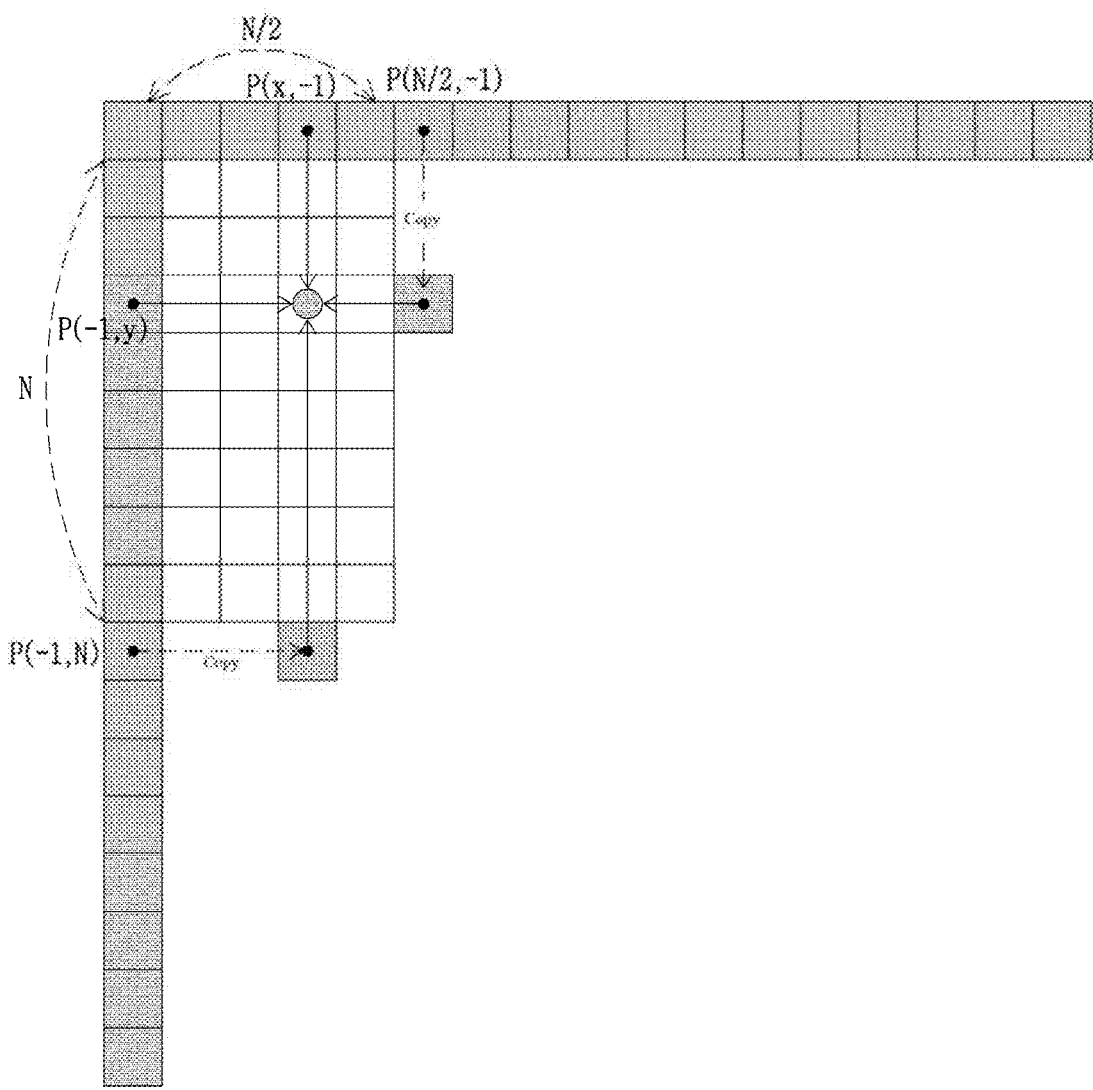
FIGS. 19 and 20 are diagrams for explaining a determination of a right reference sample and a bottom reference sample for a non-square block, according to an embodiment of the present invention.
Figure 20:
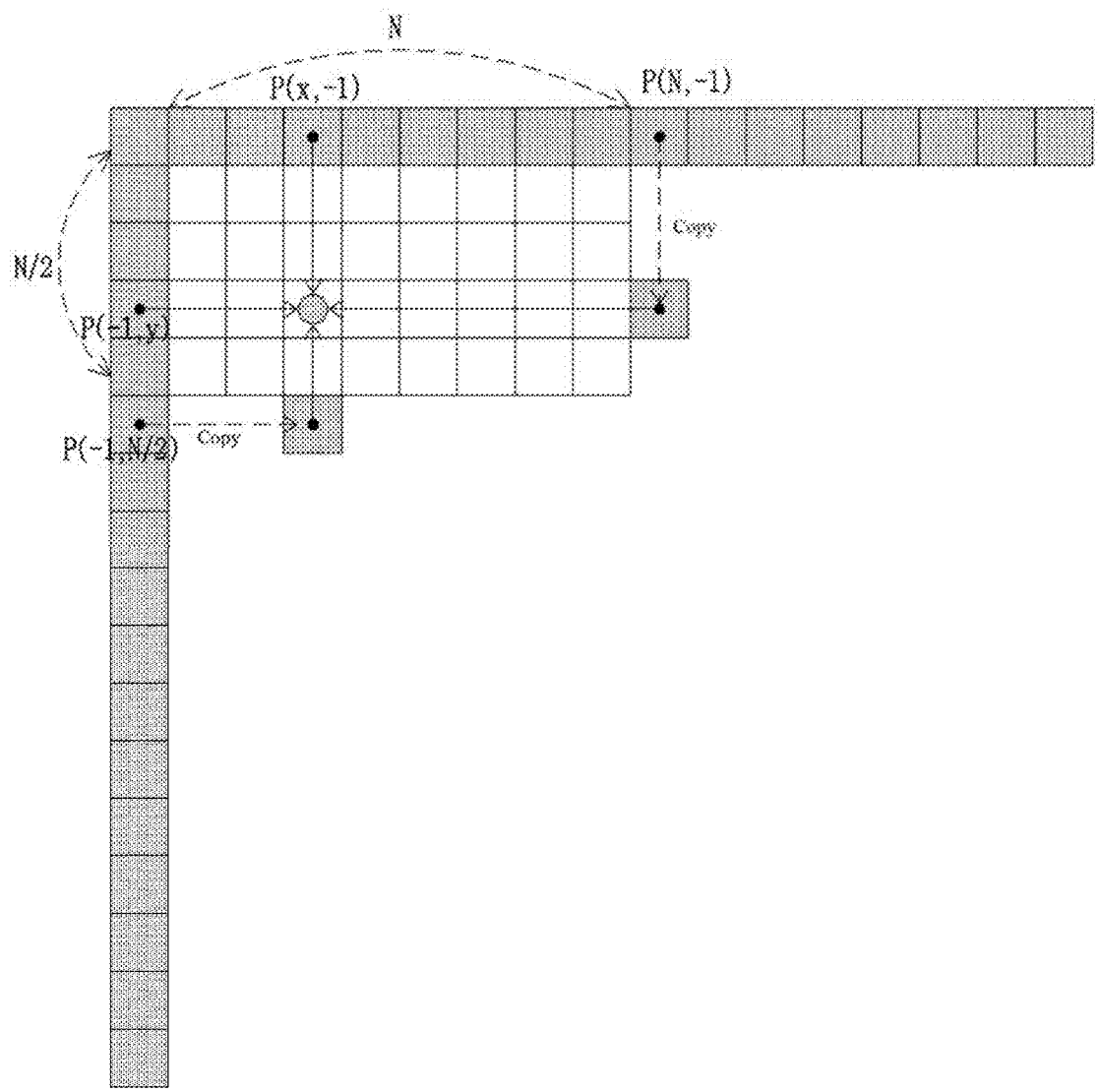

FIGS. 19 and 20 are diagrams for explaining determination of a right reference sample and a bottom reference sample for a non-square block, according to an embodiment of the present invention.

As in the example shown in FIG. 19, when the current block is a non-square block of (N/2)×N size, a right reference sample is derived based on a top reference sample P(N/2, −1), and a bottom reference sample is derived based on a left reference sample P(−1, N).

Alternatively, the right reference sample or the bottom reference sample may be derived based on at least one of a weighted sum, an average value, a minimum value, or a maximum value of the top reference sample P(N/2, −1) and the left reference sample P(−1, N). For example, the right reference sample may be derived as a weighted sum or an average of P(N/2, −1) and P (−1, N), or may be derived as a weighted sum or an average of the above calculated value and the top reference sample. Alternatively, the bottom reference sample may be derived as a weighted sum or an average of P(N/2, −1) and P(−1, N), or may be derived as a weighted sum or an average of the above calculated value and the left reference sample.

On the other hand, as in the example shown in FIG. 20, if the current block is a non-square block of N×(N/2) size, the right reference sample may be derived based on the top reference sample P(N, −1) and the bottom reference sample may be derived based on the left reference sample P(−1, N/2).

Alternatively, it is also possible to derive the right reference sample or the bottom reference sample based on at least one of a weighted sum, an average value, a minimum value, or a maximum value of the top reference sample P(N, −1) and the left reference sample P(−1, N/2). For example, the right reference sample may be derived as a weighted sum or an average of P(N, −1) and P(−1, N/2), or may be derived as a weighted sum or an average of the above calculated value and the top reference sample. Alternatively, the bottom reference sample may be derived as a weighted sum or an average of P(N, −1) and P(−1, N/2), or may be derived as a weighted sum or an average of the above calculated value and the left reference sample.

Namely, the bottom reference sample may be derived based on at least one of the bottom left reference sample of the current block located on the same horizontal line as the bottom reference sample or the top right reference sample of the current block located on the same vertical line as the right reference sample, and the right reference sample may be derived based on at least one of the top right reference sample of the current block located on the same vertical line as the right reference sample or the bottom left reference sample of the current block located on the same horizontal line as the bottom reference sample.

The first prediction image may be calculated based on a weighted prediction of reference samples located on the same horizontal line as the prediction target sample. In addition, the second prediction image may be calculated based on a weighted prediction of reference samples located on the same vertical line as the prediction target sample.

Alternatively, it is also possible to generate the first prediction image or the second prediction image based on an average value, a minimum value or a maximum value of reference samples.

A method of deriving a reference sample or a method of deriving the first prediction image or the second prediction image may be set differently depending on whether the prediction target sample is included in a predetermined area in the current block, a size or a shape of the current block. Specifically, depending on the position of the prediction target sample, the number or positions of reference samples used to derive the right or bottom reference sample may be determined differently, or depending on the position of the prediction target sample, the weight or the number of reference samples used to derive the first prediction image or the second prediction image may be set differently.

For example, a right reference sample used to derive first prediction image of prediction target samples included in the predetermined region may be derived using only the top reference sample, and a right reference sample used to derive the first prediction image of prediction target samples outside of the predetermined region may be derived based on a weighted sum or an average of a top reference sample and a left reference sample.

For example, as in the example shown in FIG. 19, when the current block is a non-square block whose height is longer than a width, the right reference sample of the prediction target sample located at (x, y) and included in the predetermined region of the current block may be derived from P(N/2, −1). On the other hand, the right reference sample of the prediction target sample located at (x', y') and outside of the predetermined region in the current block may be derived based on a weighted sum or an average value of P(N/2, −1) and P(−1, N).

Alternatively, as in the example shown in FIG. 20, when the current block is a non-square block whose width is greater than a height, a bottom reference sample of the prediction target sample located at (x, y) and included in the predetermined region in the current block may be derived based on P(−1, N/2). On the other hand, a bottom reference sample of the prediction target sample located at (x', y') and outside of the predetermined region in the current block may be derived based on a weighted sum or an average value of P(N, −1) and P(−1, N/2).

For example, the first prediction image or the second prediction image for the prediction target samples included in the predetermined region may be generated based on the weighted sum of reference samples. On the other hand, the first prediction image or the second prediction image for the prediction target samples outside the predetermined region may be generated by an average value, a minimum value, or a maximum value of reference samples or may be generated by using only one of reference samples located at a predetermined position. For example, as shown in an example in FIG. 19, if the current block is a non-square block whose height is longer than a width, the first prediction image for the prediction target sample located at (x, y) and included in the predetermined region may be generated by using only one of a right reference sample P(N/2, y) derived from P(N/2, −1) or a left reference sample located at P(−1, y). On the other hand, the first prediction image for the prediction target sample located at (x', y') and outside of the predetermined region may be generated based on a weighted sum or an average of a right reference sample P(N/2, y') derived from P(N/2, −1) and a reference sample located at P(−1, y').

Alternatively, as in an example shown in FIG. 20, if the current block is a non-square block whose width is greater than a height, the second prediction image for the prediction target sample located at (x, y) and included in the predetermined region of the current block may be generated by using only one of a bottom reference sample P(x, N/2) derived from P(−1, N/2) or a top reference sample located at P(x, −1). On the other hand, the second prediction image for the prediction target sample located at (x', y') and does not included in the predetermined region may be generated based on a weighted sum or an average of a bottom reference sample P(x', N/2) derived from P(−1, N/2) and a reference sample located at P(−1, y').

In the above-described embodiment, the predetermined region or an outer region of the predetermined region may include a remaining region excluding samples located at a boundary of the current block. The boundary of the current block may include at least one of a left boundary, a right boundary, a top boundary, or a bottom boundary. In addition, the number or position of boundaries included in the predetermined region or the outer region of the predetermined region may be set differently according to a shape of the current block.

Under planar mode, the final prediction image may be derived based on a weighted sum, an average value, a minimum value, or a maximum value of the first prediction image and the second prediction image.

For example, the following Equation 9 shows an example of generating the final prediction image P based on the weighted sum of the first prediction image $P_h$ and the second prediction image $P_v$.

$$P(x,y)=(w*P_h(x,y)+(1-w)*P_v(x,y)+N)>>(\log 2(N)+1 \quad \text{[Equation 9]}$$

In Equation 9, the prediction weight w may be different according to a shape or a size of the current block, or a position of the prediction target sample.

For example, the prediction weight w may be derived in consideration of a width of the current block, a height of the current block, or a ratio between the width and the height. If the current block is a non-square block whose width is greater than the height, w may be set so that more weight is given to the first prediction image. On the other hand, if the current block is a non-square block whose height is greater than the width, w may be set so that more weight is given to the second prediction image.

For example, when the current block has a square shape, the prediction weight w may have a value of ½. On the other hand, if the current block is a non-square block whose height is greater than the width (e.g., (N/2)×N), the prediction weight w may be set to ¼, and if the current block is a non-square block whose width is greater than the height (e.g., N×(N/2)), the prediction weight w may be set to ¾.

When an intra prediction mode of a current block is a directional prediction mode, intra prediction of the current block may be performed based on a directionality of the directional prediction mode. For example, Table 3 shows intra direction parameters (intraPredAng) of Mode 2 to Mode 34, which are directional intra prediction modes shown in FIG. 8.

TABLE 3

| | Pred Mode Intra | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Intra Pred Ang | — | 32 | 26 | 21 | 17 | 13 | 9 | 5 | 2 | 0 | −2 | −5 | −9 | −13 | −17 | −21 |

| | Pred Mode Intra | | | | | | | | | | | | | | | |
|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 |
| Intra Pred Ang | −32 | −26 | −21 | −17 | −13 | −9 | −5 | −2 | 0 | 2 | 5 | 9 | 13 | 17 | 21 | 26 |

In Table 3, although 33 directional intra prediction modes are exemplified, it is also possible that more or fewer directional intra prediction modes are defined.

Based on a lookup table defining a mapping relationship between a directional intra prediction mode and an intra direction parameter, an intra direction parameter for the current block may be determined. Alternatively, an intra direction parameter for the current block may be determined based on information signaled through a bitstream.

Intra prediction of the current block may be performed using at least one of a left reference sample or a top reference sample, depending on the directionality of the directional intra prediction mode. Here, the top reference sample means a reference sample (e.g., (−1, −1) to (2W−1, −1)) having a y-axis coordinate smaller than a prediction sample (x, 0) included in the top most row in the current block and the left reference sample means a reference sample (e.g., (−1, −1) to (−1, 2H−1)) having an x-axis coordinate smaller than a prediction sample (0, y) included in a left most column in the current block.

It is possible to arrange reference samples of the current block in one dimension according to the directionality of the intra prediction mode. Specifically, when both the top reference sample and the left reference sample are to be used in the intra prediction of the current block, it is possible to select reference samples for each prediction target sample, assuming that they are arranged in a line in a vertical direction or a horizontal direction.

For example, when the intra direction parameter is negative (for example, in the case of intra prediction modes corresponding to Mode 11 to Mode 25 in Table 3), a one-dimensional reference sample group (P_ref_1D) may be constructed by rearranging top reference samples and left reference samples in the horizontal direction or the vertical direction.

Figure 21:
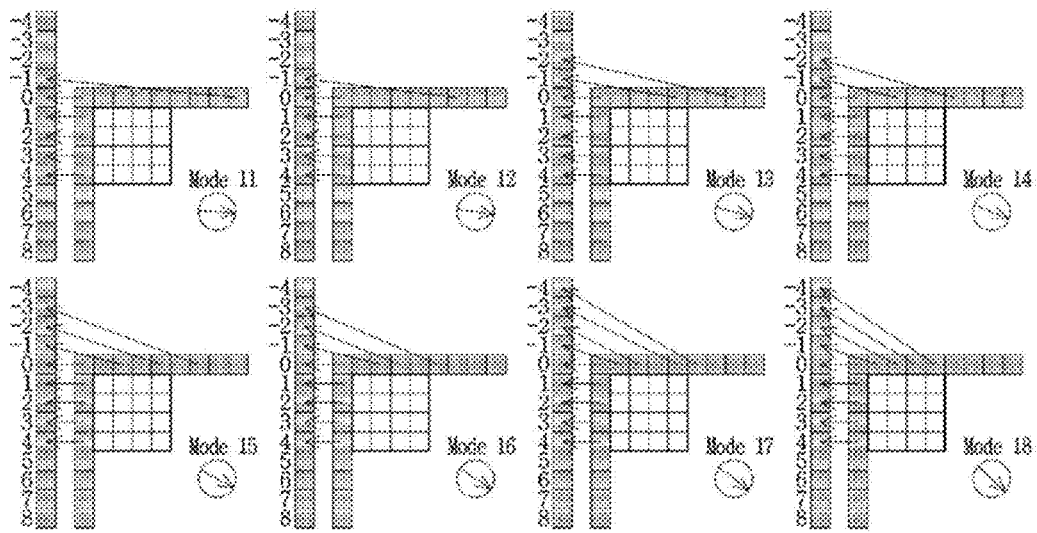
FIGS. 21 and 22 are diagrams illustrating a one-dimensional reference sample group in which reference samples are rearranged in a line.
Figure 22:
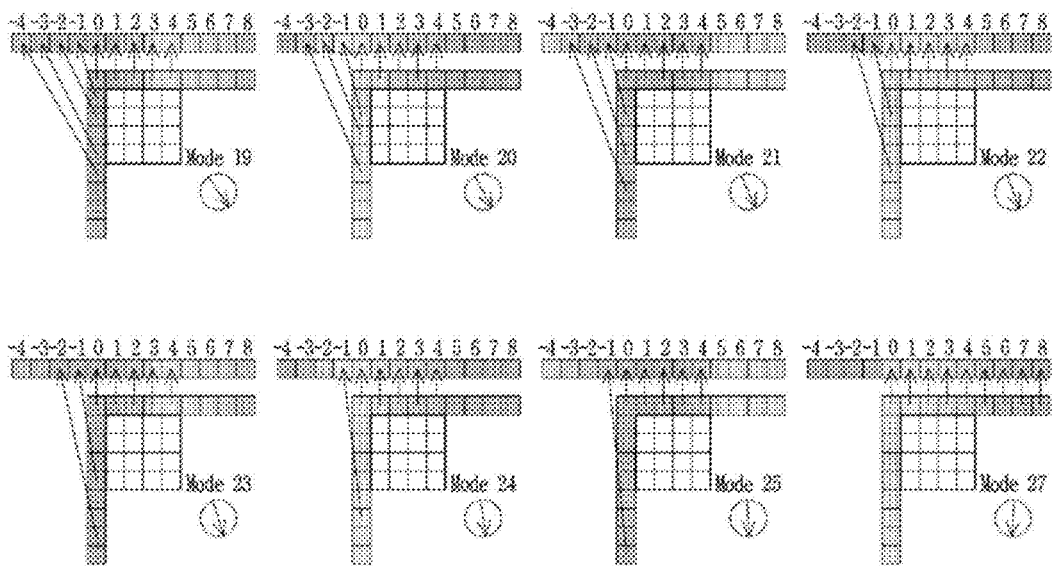

FIGS. 21 and 22 are diagrams illustrating a one-dimensional reference sample group in which reference samples are rearranged in a line.

Whether the reference samples are rearranged in the vertical direction or in the horizontal direction may be determined according to the directionality of the intra prediction mode. For example, as in the example shown in FIG. 21, if the intra prediction mode index is in 11 to 18, the top reference samples of the current block are rotated counter-clockwise so that the one-dimensional reference sample group is generated which the left reference samples and the top reference samples are arranged in the vertical direction.

On the other hand, as in the example shown in FIG. 22, when the intra prediction mode index is in 19 to 25, the left reference samples of the current block are rotated clockwise so that the one-dimensional reference sample group is generated which the left reference samples and the top reference samples are arranged in the horizontal direction.

If the intra direction parameter of the current block is not negative, intra prediction for the current block may be performed using only the left reference samples or the top reference samples. Thereby, the one-dimensional reference sample group for intra prediction modes whose intra direction parameters are not negative may be generated by using only the left reference samples or the top reference samples.

Based on the intra direction parameter, a reference sample determination index iIdx may be derived for specifying at least one reference sample used to predict the prediction target sample. In addition, a weight-related parameter $i_{fact}$, which is used to determine weights applied to each reference sample, may be derived based on the intra direction parameter. For example, the following Equations 10 and 11 show examples of deriving the reference sample determination index and the weight-related parameter.

$$iIdx=(y+1)*(P_{ang}/32) ifact=[(y+1)*P_{ang}]31 \qquad \text{[Equation 10]}$$

Based on the reference sample determination index, at least one reference sample may be specified for each prediction target sample. For example, based on the reference sample determination index, a position of a reference sample in the one-dimensional reference sample group for predicting the prediction target sample in the current block may be specified. Based on the reference sample at the specified position, a prediction image (i.e., a prediction sample) for the prediction target sample may be generated.

A plurality of intra prediction modes may be used to perform intra prediction for the current block. For example, different intra prediction modes or different directional intra prediction modes may be applied to each of prediction target samples in the current block. Alternatively, different intra prediction modes or different directional intra prediction modes may be applied to each of predetermined sample groups in the current block. Here, the predetermined sample group may represent a sub-block having a predetermined size/shape, a block including a predetermined number of prediction target samples, or a predetermined area. The number of sample groups may be variably determined according to a size/shape of the current block, the number of prediction target samples included in the current block, the intra prediction mode of the current block, or the like, or may have a fixed number predefined in the encoder and the decoder. Alternatively, it is also possible to signal the number of sample groups included in the current block through the bitstream.

A plurality of intra prediction modes for the current block may be represented by a combination of the plurality of intra prediction modes. For example, the plurality of intra prediction modes may be represented by a combination of a plurality of non-directional intra prediction modes, a combination of a directional prediction mode and a non-directional intra prediction mode, or a combination of a plurality of directional intra prediction modes. Alternatively, the intra prediction mode may be encoded/decoded for each unit to which different intra prediction modes are applied.

When the intra-prediction mode of the current block is considered, if it is determined that the prediction target sample cannot be predicted by only one reference sample, prediction of the prediction target sample may be performed using a plurality of reference samples. Specifically, in accordance with the intra prediction mode of the current block, it is possible to perform prediction on the prediction target sample by interpolating a reference sample at a predetermined position and a neighboring reference sample neighboring the reference sample at the predetermined position.

For example, when an imaginary angular line following a slope of the intra prediction mode or an angle of the intra prediction mode does not pass an integer pel (i.e., a reference sample at an integer position) in the one-dimensional reference sample group, a prediction image for the prediction target sample may be generated by interpolating a reference sample positioned on the angular line and a reference sample adjacent to a left/right or top/bottom side of the reference sample. For example, the following Equation 11 shows an example of interpolating two or more reference samples to generate a prediction sample P (x, y) for the prediction target sample.

$$P(x,y)=(32-i_{fact})/32*P\_ref\_1D(x+iIdx+1)+i_{fact}/32*P\_ref\_1D(x+iIdx+2) \qquad \text{[Equation 11]}$$

Coefficients of an interpolation filter may be determined based on the weight-related parameter $i_{fact}$. For example, the coefficients of the interpolation filter may be determined based on a distance between a fractional pel located on the angular line and an integer pel (i.e., an integer position of each reference sample).

When the intra prediction mode of the current block is considered, if the prediction target sample can be predicted by only one reference sample, a prediction image for the prediction target sample may be generated based on a reference sample specified by the intra prediction mode of the current block.

For example, an imaginary angular line following a slope of the intra prediction mode or an angle of the intra prediction mode passes an integer pel (i.e., a reference sample at an integer position) in the one-dimensional reference sample group, a prediction image for the prediction target sample may be generated by copying a reference sample at the integer pel or by considering a distance between a reference sample at the integer pel and the prediction target sample. For example, the following Equation 12 is an example of generating a prediction image P(x,y) for the prediction target sample by copying a reference sample P_ref_1D(x+iIdx+1) in the one-dimensional sample group specified by the intra prediction mode of the current block.

$$P(x,y)=P\_ref\_1D(x+iIdx+1) \qquad \text{[Equation 12]}$$

For convenience of explanation, in the embodiments described later, a reference sample specified by the intra prediction mode of the current block or an one-dimensional reference sample specified by the intra prediction mode of the current block will be referred to as a first reference sample. For example, in a planar mode, reference samples used to obtain a horizontal prediction image or a vertical prediction image of the prediction target sample may be referred to as first reference samples, and in a directional intra prediction mode, a reference sample of the prediction target sample specified by the directionality of the intra prediction mode may be referred to as a first prediction reference sample. In addition, a prediction sample generated by predicting the prediction target sample based on the first reference sample will be referred to as a first prediction image (or a first prediction sample), and intra prediction using the first reference sample will be referred to as a first intra prediction.

According to the present invention, in order to increase the efficiency of intra prediction, it is possible to obtain a second prediction image (or a second prediction sample) for the prediction target sample by using a second reference sample at a predetermined position. Specifically, the second prediction sample for the prediction target sample may be generated by weight-prediction of the first prediction image generated as a result of the first intra prediction and the second reference sample at the predetermined position.

Whether or not to generate the second prediction sample may be determined based on a size of the current block, a shape of the current block, an intra prediction mode of the current block (for example, whether it is a directional intra prediction mode), a direction of the intra prediction mode, a distance between the prediction target sample and the first reference sample and the like. Here, the distance between the first reference sample and the prediction target sample may be calculated based on a distance of x-axis between the first reference sample and the prediction target sample and a distance of y-axis between the first reference sample and the prediction target sample.

Figure 23:
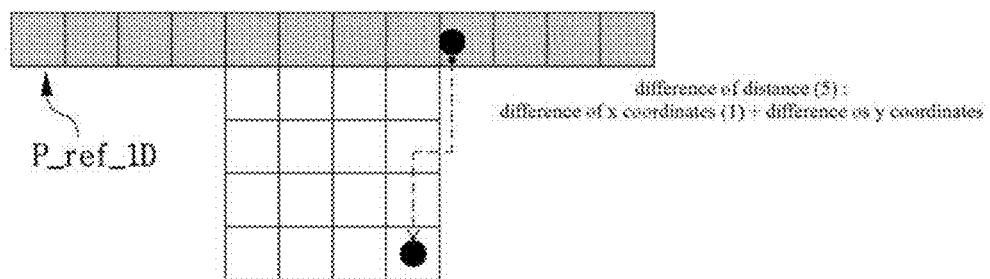
FIG. 23 is a diagram for explaining a distance between a first reference sample and a prediction target sample.

FIG. 23 is a diagram for explaining a distance between a first reference sample and a prediction target sample. In FIG. 23, it is exemplified that a distance between the first reference sample and the prediction target sample is calculated by summing an absolute value of an x-coordinate difference between the first reference sample and the prediction target sample and an absolute value of a y-coordinate difference between the first reference sample and the prediction target sample.

As an example, it is possible to compare a distance between the prediction target sample and the first reference sample with a threshold value, and then determine whether to generate a second prediction image according to the result of the comparison. The threshold value may be determined depending on a width, height, intra prediction mode (for example, whether it is a directional intra-prediction mode) of the prediction block or a slope of the intra prediction mode.

The first reference sample used in the first intra prediction can be set as the second reference sample. For example, if a plurality of reference samples are used in the first intra prediction, any one of the plurality of reference samples may be set as the second reference sample.

Alternatively, a reference sample located at a position different from the first reference sample may be set as the second reference sample. At this time, the first reference sample and the second reference sample may be adjacent to the same boundary of the current block, or may be adjacent to different boundaries of the current block. For example, both the first reference sample and the second reference sample may be top reference samples of the current block or left reference samples of the current block, or either the first reference sample or the second reference sample is the top reference sample while the other is the left reference sample.

Figure 24:
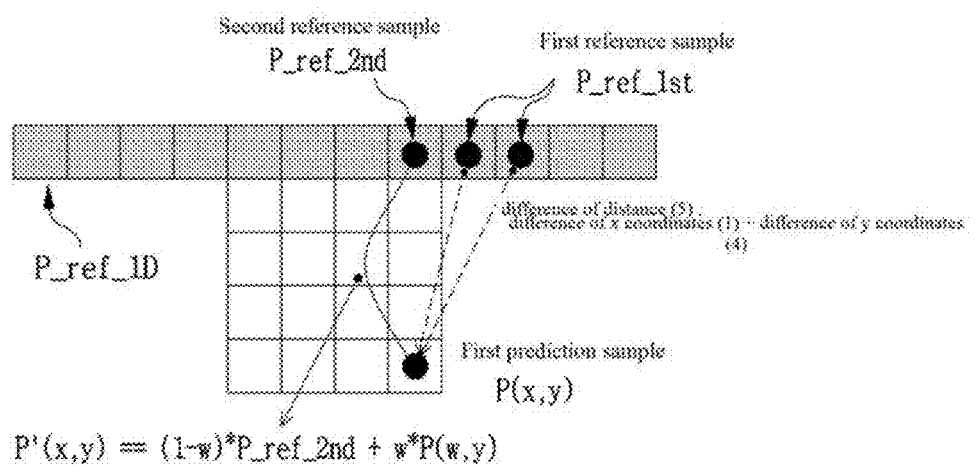
FIGS. 24 and 25 are diagrams showing positions of a first reference sample and a second reference sample.
Figure 25:
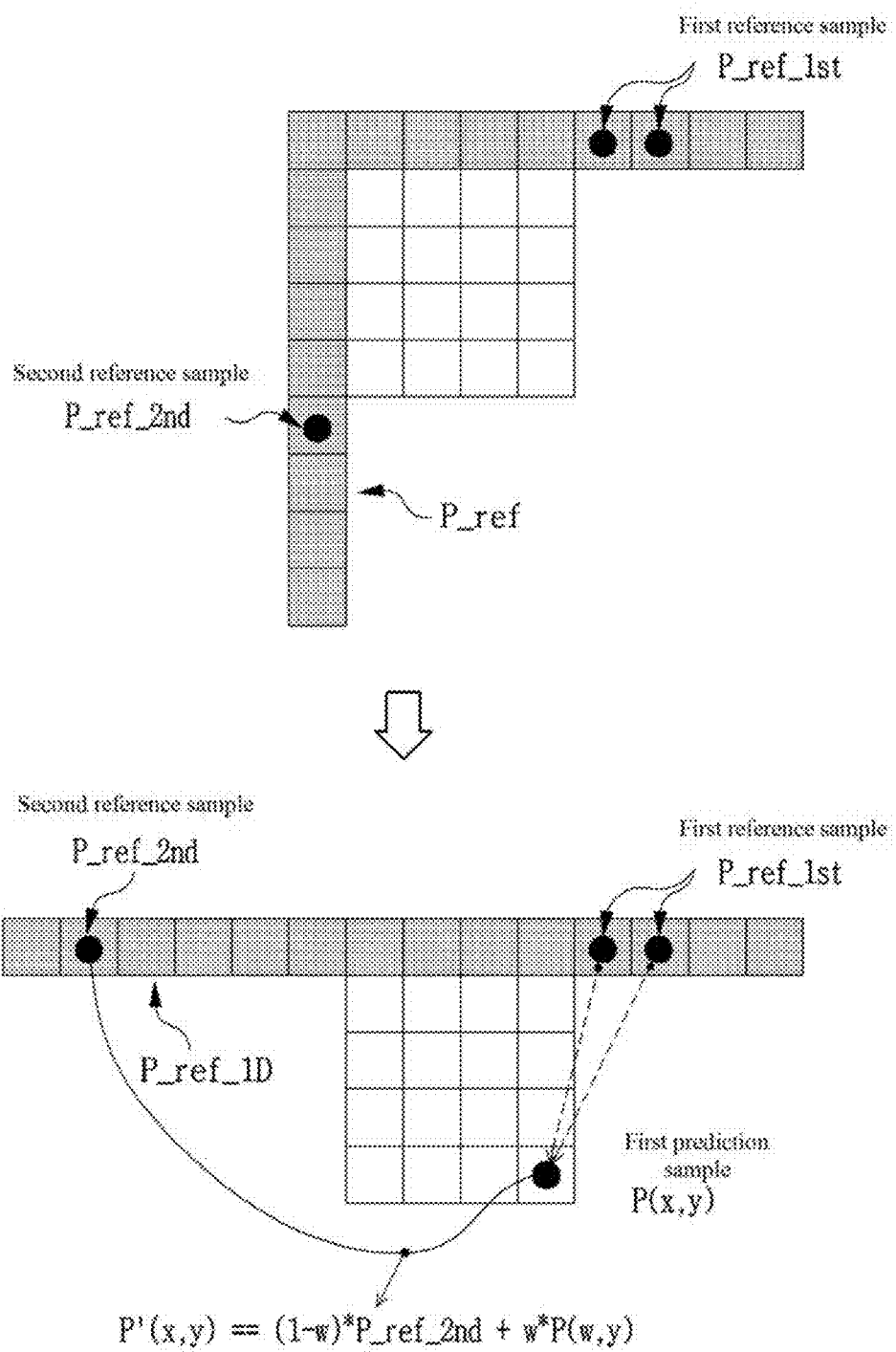

FIGS. 24 and 25 are diagrams showing positions of a first reference sample and a second reference sample.

FIG. 24 shows an example in which the first reference sample and the second reference sample are adjacent to the same boundary of the current block, and FIG. 25 shows an example in which each of the first reference sample and the second reference sample are adjacent to different boundaries of the current block.

Specifically, it is depicted in FIG. 24 that both the first reference sample and the second reference sample are the top reference samples of the current block, and it is depicted in FIG. 25 that the first reference sample of the current block is the top reference sample while the second reference sample is the left reference sample of the current block.

The second reference sample may include a reference sample closest to the prediction target sample. Here, the reference sample closest to the prediction target sample may include at least one of a reference sample lying on the same horizontal line as the prediction target sample or a reference sample lying on the same vertical line as the prediction target sample.

Alternatively, a reference sample neighboring to the first reference sample may be determined as the second reference sample.

As another example, the second reference sample may be determined based on the directionality of the intra prediction mode of the current block. For example, the second reference sample may be specified by an imaginary angular line following the slope of the intra-prediction mode of the current block. For example, when the angular line is extended to both sides, the reference sample located on one side of the angular line may be set as the first reference sample, and the reference sample located on the other side of the angular line may be set as the second reference sample.

Figure 26:
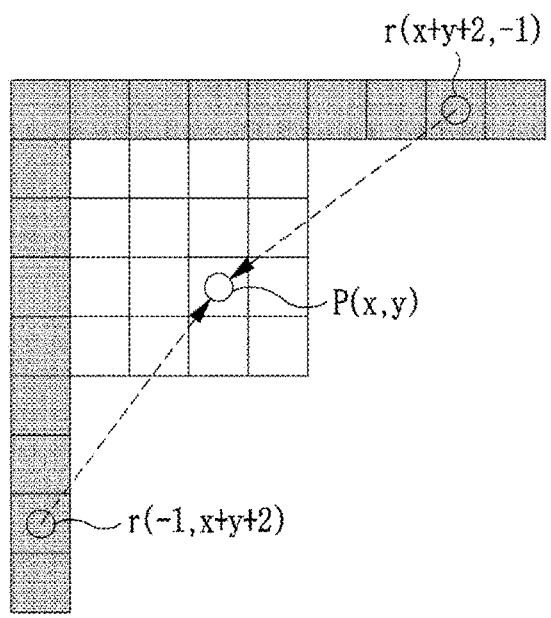
FIG. 26 is a diagram showing positions of a first reference sample and a second reference sample.

FIG. 26 is a diagram showing positions of a first reference sample and a second reference sample. If it is assumed that that the intra prediction mode of the current block is a left-bottom diagonal direction (for example, Mode 2 shown in FIG. 8) or a top-right diagonal direction (for example, Mode 34 shown in FIG. 8), when the angular line defined by the intra prediction mode is extended to both sides from the prediction target sample, reference samples located at positions passing through the angular line may be set as the first reference sample and the second reference sample. For example, when the intra prediction mode of the current block is the top-right diagonal direction, a reference sample located at a position of r(x+y+2, −1) is determined as the first reference sample and a reference a reference sample located at a position of r(−1, x+y+2) is determined as the second reference sample for the prediction target sample located at (2, 2). On the other hand, when the intra prediction mode of the current block is the left-bottom diagonal direction, a reference sample located at a position of r (−1, x+y+2) is determined as the first reference sample and a reference sample located at a position of r (x+y+2, −1) is determined as the second reference sample for the prediction target sample located at (2, 2).

Alternatively, a reference sample at a predefined location may be set as the second reference sample. For example, a reference sample adjacent to a top-left corner of the current block, a reference sample adjacent to a top-right corner of the current block, or a reference sample adjacent to a left-bottom corner of the current block may be set as the second reference sample.

A plurality of reference samples may be selected as the second reference sample. For example, a plurality of reference samples satisfying a condition described above may be selected as the second reference samples for second intra prediction The second prediction image may be generated by weighted sum of the first prediction image and the second reference sample. For example, the following Equation 13 represents an example of generating a second prediction image P'(x, y) for a prediction target sample (x, y) through a weighted sum of a second reference sample P_ref_2nd and a first prediction image P(x, y).

$$P'(x,y)=(1-w)*P\_ref\_2nd+w*P(x,y) \quad \text{[Equation 13]}$$

Since the first prediction image is generated by copying the first reference sample or interpolating a plurality of the first reference samples, it can be understood that the second prediction image is generated through a weighted sum of the first reference sample P_ref_1st and the second reference sample P_ref_2nd.

Weights assigned to each of the first prediction image and the second reference sample may be determined based on at least one of a size of the current block, a shape of the current block, an intra prediction mode of the current block, a position of the prediction target sample, a position of the first reference sample or a position of the second reference sample. For example, the weights assigned to each of the first prediction image and the second reference image may be determined based on a distance between the prediction target sample and the first reference sample or a distance between the prediction target sample and the second reference sample.

For example, when the distance between the prediction target sample and the first reference sample is f1 and the distance between the prediction target sample and the reference sample is f2, a weighted prediction parameter w may be set as f2/f1, f1/f2, f2/(f1+f2), or f2/(f1+f2).

The final prediction image of the prediction target sample may be determined as the first prediction image or the second prediction image. At this time, whether to determine the first prediction image as the final prediction image or whether to determine the second prediction image as the final prediction image may be determined according to a size of the current block, a shape of the current block, an intra prediction mode of the current block, position of the prediction target sample, or the like. For example, the final prediction image of the prediction target samples included in a first area in the current block is determined as the first prediction image, while the final prediction image of the prediction target samples included in a second area, which is different from the first area, is determined as the second prediction image.

Figure 27:
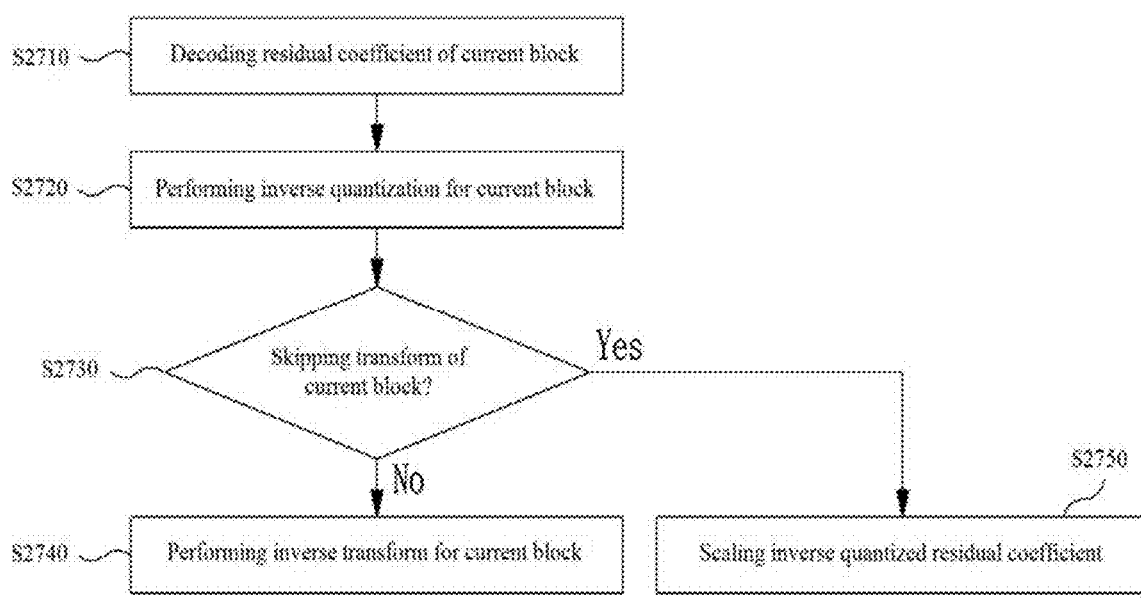
FIG. 27 is a flowchart illustrating processes of obtaining a residual sample according to an embodiment to which the present invention is applied.

FIG. 27 is a flowchart illustrating processes of obtaining a residual sample according to an embodiment to which the present invention is applied.

First, a residual coefficient of a current block may be obtained S2710. A decoder may obtain a residual coefficient through a coefficient scanning method. For example, the decoder may perform a coefficient scan using a diagonal scan, a jig-zag scan, an up-right scan, a vertical scan, or a horizontal scan, and may obtain residual coefficients in a form of a two-dimensional block.

An inverse quantization may be performed on the residual coefficient of the current block S2720.

It is possible to determine whether to skip an inverse transform on the dequantized residual coefficient of the current block S2730. Specifically, the decoder may determine whether to skip the inverse transform on at least one of a horizontal direction or a vertical direction of the current block. When it is determined to apply the inverse transform on at least one of the horizontal direction or the vertical direction of the current block, a residual sample of the current block may be obtained by inverse transforming the dequantized residual coefficient of the current block S2740. Here, the inverse transform can be performed using at least one of DCT, DST, and KLT.

When the inverse transform is skipped in both the horizontal direction and the vertical direction of the current block, inverse transform is not performed in the horizontal direction and the vertical direction of the current block. In this case, the residual sample of the current block may be obtained by scaling the dequantized residual coefficient with a predetermined value S2750.

Skipping the inverse transform on the horizontal direction means that the inverse transform is not performed on the horizontal direction but the inverse transform is performed on the vertical direction. At this time, scaling may be performed in the horizontal direction.

Skipping the inverse transform on the vertical direction means that the inverse transform is not performed on the vertical direction but the inverse transform is performed on the horizontal direction. At this time, scaling may be performed in the vertical direction.

It may be determined whether or not an inverse transform skip technique may be used for the current block depending on a partition type of the current block. For example, if the current block is generated through a binary tree-based partitioning, the inverse transform skip scheme may be restricted for the current block. Accordingly, when the current block is generated through the binary tree-based partitioning, the residual sample of the current block may be obtained by inverse transforming the current block. In addition, when the current block is generated through binary tree-based partitioning, encoding/decoding of information indicating whether or not the inverse transform is skipped (e.g., transform_skip_flag) may be omitted.

Alternatively, when the current block is generated through binary tree-based partitioning, it is possible to limit the inverse transform skip scheme to at least one of the horizontal direction or the vertical direction. Here, the direction in which the inverse transform skip scheme is limited may be determined based on information decoded from the bitstream, or may be adaptively determined based on at least one of a size of the current block, a shape of the current block, or an intra prediction mode of the current block.

For example, when the current block is a non-square block having a width greater than a height, the inverse transform skip scheme may be allowed only in the vertical direction and restricted in the horizontal direction. That is, when the current block is 2N×N, the inverse transform is performed in the horizontal direction of the current block, and the inverse transform may be selectively performed in the vertical direction.

On the other hand, when the current block is a non-square block having a height greater than a width, the inverse transform skip scheme may be allowed only in the horizontal direction and restricted in the vertical direction. That is, when the current block is N×2N, the inverse transform is performed in the vertical direction of the current block, and the inverse transform may be selectively performed in the horizontal direction.

In contrast to the above example, when the current block is a non-square block having a width greater than a height, the inverse transform skip scheme may be allowed only in the horizontal direction, and when the current block is a non-square block having a height greater than a width, the inverse transform skip scheme may be allowed only in the vertical direction.

Information indicating whether or not to skip the inverse transform with respect to the horizontal direction or information indicating whether to skip the inverse transformation with respect to the vertical direction may be signaled through a bitstream. For example, the information indicating whether or not to skip the inverse transform on the horizontal direction is a 1-bit flag, 'hor_transform_skip_flag', and information indicating whether to skip the inverse transform on the vertical direction is a 1-bit flag, 'ver_transform_skip_flag'. The encoder may encode at least one of 'hor_transform_skip_flag' or 'ver_transform_skip_flag' according to the shape of the current block. Further, the decoder may determine whether or not the inverse transform on the horizontal direction or on the vertical direction is skipped by using at least one of "hor_transform_skip_flag" or "ver_transform_skip_flag".

It may be set to skip the inverse transform for any one direction of the current block depending on a partition type of the current block. For example, if the current block is generated through a binary tree-based partitioning, the inverse transform on the horizontal direction or vertical direction may be skipped. That is, if the current block is generated by binary tree-based partitioning, it may be determined that the inverse transform for the current block is skipped on at least one of a horizontal direction or a vertical direction without encoding/decoding information (e.g., transform_skip_flag, hor_transform_skip_flag, ver_transform_skip_flag) indicating whether or not the inverse transform of the current block is skipped.

Although the above-described embodiments have been described on the basis of a series of steps or flowcharts, they do not limit the time-series order of the invention, and may be performed simultaneously or in different orders as necessary. Further, each of the components (for example, units, modules, etc.) constituting the block diagram in the above-described embodiments may be implemented by a hardware device or software, and a plurality of components. Or a plurality of components may be combined and implemented by a single hardware device or software. The above-described embodiments may be implemented in the form of program instructions that may be executed through various computer components and recorded in a computer-readable recording medium. The computer-readable recording medium may include one of or combination of program commands, data files, data structures, and the like. Examples of computer-readable media include magnetic media such as hard disks, floppy disks and magnetic tape, optical recording media such as CD-ROMs and DVDs, magneto-optical media such as floptical disks, media, and hardware devices specifically configured to store and execute program instructions such as ROM, RAM, flash memory, and the like. The hardware device may be configured to operate as one or more software modules for performing the process according to the present invention, and vice versa.

INDUSTRIAL APPLICABILITY

The present invention may be applied to electronic devices which is able to encode/decode a video.

The invention claimed is:

1. A method for decoding a video, the method comprising:
determining an intra prediction mode of a current block;
obtaining a prediction sample at a target position based on the intra prediction mode and a first reference sample; and
determining whether to modify the prediction sample or not,
wherein determination of whether the prediction sample is modified or not is based on a size and the intra prediction mode of the current block,
wherein when it is determined to modify the prediction sample, the prediction sample is modified by using a second reference sample,
wherein the second reference sample is determined based on a prediction angle of the intra prediction mode when the intra prediction mode is a directional mode, and
wherein when the intra prediction mode is a top-right diagonal directional mode, the second reference sample comprises a left reference sample lying on a bottom-left diagonal direction from the target position.

2. The method of claim 1, wherein when the intra prediction mode is not the directional mode, at least one of a horizontal reference sample or a vertical reference sample is determined as the second reference sample, the horizontal reference sample lying on a same horizontal line as the target position, the vertical reference sample lying on a same vertical line as the target position.

3. The method of claim 1, wherein the modified prediction sample is obtained based on a weighted sum of the prediction sample and the second reference sample.

4. The method of claim 3, wherein weights applied to each of the prediction sample and the second reference sample are determined based on a coordinate of the target position.

5. A method for encoding a video, the method comprising:
determining an intra prediction mode of a current block;
obtaining a prediction sample at a target position based on the intra prediction mode and a first reference sample; and
determining whether to modify the prediction sample or not,
wherein determination of whether the prediction sample is modified or not is based on a size and the intra prediction mode of the current block,
wherein when it is determined to modify the prediction sample, the prediction sample is modified by using a second reference sample,
wherein the second reference sample is determined based on a prediction angle of the intra prediction mode when the intra prediction mode is a directional mode, and
wherein when the intra prediction mode is a top-right diagonal direction, the second reference sample comprises a left reference sample lying on a bottom-left diagonal direction from the target position.

6. The method of claim 5, wherein when the intra prediction mode is not the directional mode, at least one of a horizontal reference sample or a vertical reference sample is determined as the second reference sample, the horizontal reference sample lying on a same horizontal line as the target position, the vertical reference sample lying on a same vertical line as the target position.

7. The method of claim 5, wherein the modified prediction sample is obtained based on a weighted sum of the prediction sample and the second reference sample.

8. The method of claim 7, wherein weights applied to each of the prediction sample and the second reference sample are determined based on a coordinate of the target position.

9. A non-transitory computer-readable medium for storing data associated with a video signal, comprising:

a data stream stored in the non-transitory computer-readable medium, the data stream being encoded by an encoding method which comprising:

determining an intra prediction mode of a current block;

obtaining a prediction sample at a target position based on the intra prediction mode and a first reference sample; and determining whether to modify the prediction sample or not, wherein determination of whether the prediction sample is modified or not is based on a size and the intra prediction mode of the current block, wherein when it is determined to modify the prediction sample, the prediction sample is modified by using a second reference sample, wherein the second reference sample is determined based on a prediction angle of the intra prediction mode when the intra prediction mode is a directional mode, and wherein when the intra prediction mode is a top-right diagonal direction, the second reference sample comprises a left reference sample lying on a bottom-left diagonal direction from the target position.

* * * * *